(12) United States Patent
Petrov et al.

(10) Patent No.: US 7,941,521 B1
(45) Date of Patent: *May 10, 2011

(54) MULTI-SERVICE MANAGEMENT ARCHITECTURE EMPLOYED WITHIN A CLUSTERED NODE CONFIGURATION

(75) Inventors: Miroslav R. Petrov, Sofia (BG); Georgi Zdr. Shirkov, Sofia (BG); Reinhold Kautzleben, Karlsruhe (DE); Gregor K. Frey, Lorsch (DE)

(73) Assignee: SAP AG, Walldorf (DE)

( * ) Notice: Subject to any disclaimer, the term of this patent is extended or adjusted under 35 U.S.C. 154(b) by 1461 days.

This patent is subject to a terminal disclaimer.

(21) Appl. No.: 10/749,850

(22) Filed: Dec. 30, 2003

(51) Int. Cl.
*G06F 15/173* (2006.01)
(52) U.S. Cl. ........ 709/224; 709/217; 709/218; 709/219; 709/225; 709/226
(58) Field of Classification Search .................. 709/216, 709/217, 218, 224, 225, 226
See application file for complete search history.

(56) References Cited

U.S. PATENT DOCUMENTS

| | | |
|---|---|---|
| 5,201,044 A | 4/1993 | Frey et al. |
| 5,608,720 A | 3/1997 | Biegel et al. |
| 5,802,291 A | 9/1998 | Balick et al. |
| 5,944,841 A | 8/1999 | Christie |
| 6,026,237 A | 2/2000 | Berry et al. |
| 6,055,492 A | 4/2000 | Alexander, III et al. |
| 6,061,721 A | 5/2000 | Ismael et al. |
| 6,066,181 A | 5/2000 | DeMaster |
| 6,083,281 A | 7/2000 | Diec et al. |
| 6,118,940 A | 9/2000 | Alexander, III et al. |
| 6,134,581 A | 10/2000 | Ismael et al. |
| 6,144,967 A | 11/2000 | Nock |

(Continued)

FOREIGN PATENT DOCUMENTS

JP 2001195151 7/2001
(Continued)

OTHER PUBLICATIONS

Sun Microsystems, Inc., "The Source for Developers: Core Java Java Management Extensions (JMX)" 2 pages, http://java.sun.com/products/JavaManagement/ printed Apr. 2, 2004.

(Continued)

*Primary Examiner* — Rupal D Dharia
*Assistant Examiner* — Van Kim T Nguyen
(74) *Attorney, Agent, or Firm* — Blakley, Sokoloff, Taylor & Zafman LLP

(57) ABSTRACT

A monitoring system is described which simplifies the management of complex, multi-tiered networks such as those used in large enterprises. One embodiment of the system is implemented on a cluster of application servers which are communicatively coupled together on a network to serve applications over the network to a plurality of clients. One embodiment of the monitoring system is built from a group of services. An administration service generates a plurality of runtime management beans ("MBeans") on each of the server nodes of the cluster and associates each of the runtime MBeans with specified server node resources. In addition, in one embodiment, a notification service generates cluster-wide notifications in response to certain specified events associated with certain resources of certain MBeans. The notification service distributes the notifications across all, or a subset of, the server nodes of the cluster. In addition, a monitor service generates monitor MBeans corresponding to selected runtime MBeans. The monitor MBeans are arranged in a hierarchical tree structure and are configured to receive monitoring data from associated runtime MBeans.

21 Claims, 17 Drawing Sheets

U.S. PATENT DOCUMENTS

| | | | |
|---|---|---|---|
| 6,178,529 B1 | 1/2001 | Short et al. | |
| 6,202,199 B1 | 3/2001 | Wygodny et al. | |
| 6,205,476 B1 | 3/2001 | Hayes, Jr. | |
| 6,212,520 B1 | 4/2001 | Maruyama et al. | |
| 6,230,313 B1 | 5/2001 | Callahan, II et al. | |
| 6,260,187 B1 | 7/2001 | Cirne | |
| 6,272,537 B1 | 8/2001 | Kekic et al. | |
| 6,289,506 B1 | 9/2001 | Kwong et al. | |
| 6,308,208 B1 | 10/2001 | Jung et al. | |
| 6,351,776 B1 | 2/2002 | O'Brien et al. | |
| 6,356,931 B2 | 3/2002 | Ismael et al. | |
| 6,381,735 B1 | 4/2002 | Hunt | |
| 6,389,464 B1 | 5/2002 | Krishnamurthy et al. | |
| 6,427,228 B1* | 7/2002 | Wigger | 717/111 |
| 6,463,454 B1 | 10/2002 | Lumelsky et al. | |
| 6,466,973 B2 | 10/2002 | Jaffe | |
| 6,470,388 B1 | 10/2002 | Niemi et al. | |
| 6,539,501 B1 | 3/2003 | Edwards | |
| 6,553,403 B1 | 4/2003 | Jarriel et al. | |
| 6,567,809 B2 | 5/2003 | Santosuosso | |
| 6,591,228 B1 | 7/2003 | Hall et al. | |
| 6,631,515 B1 | 10/2003 | Berstis | |
| 6,658,600 B1 | 12/2003 | Hogdal et al. | |
| 6,662,359 B1 | 12/2003 | Berry et al. | |
| 6,664,978 B1 | 12/2003 | Kekic et al. | |
| 6,681,232 B1 | 1/2004 | Sistanizadeh et al. | |
| 6,708,173 B1 | 3/2004 | Behr et al. | |
| 6,738,933 B2 | 5/2004 | Fraenkel et al. | |
| 6,742,178 B1 | 5/2004 | Berry et al. | |
| 6,754,890 B1 | 6/2004 | Berry et al. | |
| 6,772,178 B2 | 8/2004 | Mandal et al. | |
| 6,788,315 B1 | 9/2004 | Kekic et al. | |
| 6,789,257 B1 | 9/2004 | MacPhail | |
| 6,792,456 B1* | 9/2004 | Hellerstein et al. | 709/224 |
| 6,792,460 B2 | 9/2004 | Oulu et al. | |
| 6,795,791 B2* | 9/2004 | Gorman | 702/124 |
| 6,802,067 B1 | 10/2004 | Camp et al. | |
| 6,834,301 B1 | 12/2004 | Hanchett | |
| 6,836,878 B1 | 12/2004 | Cuomo et al. | |
| 6,851,118 B1 | 2/2005 | Ismael et al. | |
| 6,853,995 B2 | 2/2005 | Matsuzaki et al. | |
| 6,857,119 B1 | 2/2005 | Desai | |
| 6,862,711 B1 | 3/2005 | Bahrs et al. | |
| 6,871,228 B2 | 3/2005 | Shah et al. | |
| 6,880,125 B2 | 4/2005 | Fry | |
| 6,895,578 B1 | 5/2005 | Kolawa et al. | |
| 6,922,417 B2 | 7/2005 | Vanlint | |
| 6,925,631 B2 | 8/2005 | Golden | |
| 6,934,942 B1 | 8/2005 | Chilimbi | |
| 6,950,874 B2 | 9/2005 | Chang et al. | |
| 6,952,726 B1 | 10/2005 | White et al. | |
| 6,961,918 B2 | 11/2005 | Garner et al. | |
| 6,968,540 B2 | 11/2005 | Beck et al. | |
| 6,985,848 B2 | 1/2006 | Swoboda et al. | |
| 6,990,601 B1 | 1/2006 | Tsuneya et al. | |
| 6,993,453 B2* | 1/2006 | Krissell | 702/182 |
| 7,000,235 B2 | 2/2006 | Mandal et al. | |
| 7,017,051 B2 | 3/2006 | Patrick | |
| 7,017,162 B2 | 3/2006 | Smith et al. | |
| 7,024,474 B2 | 4/2006 | Clubb et al. | |
| 7,051,324 B2 | 5/2006 | Gissel et al. | |
| 7,058,558 B2 | 6/2006 | Reichenthal | |
| 7,062,540 B2 | 6/2006 | Reddy et al. | |
| 7,069,267 B2 | 6/2006 | Spencer, Jr. | |
| 7,082,464 B2 | 7/2006 | Hasan et al. | |
| 7,085,851 B2 | 8/2006 | Nusbickel et al. | |
| 7,086,065 B1 | 8/2006 | Yeluripati et al. | |
| 7,086,067 B1 | 8/2006 | Wason | |
| 7,093,234 B2 | 8/2006 | Jason et al. | |
| 7,120,685 B2 | 10/2006 | Ullmann et al. | |
| 7,131,113 B2 | 10/2006 | Chang et al. | |
| 7,150,014 B2 | 12/2006 | Graupner | |
| 7,152,104 B2 | 12/2006 | Musante et al. | |
| 7,155,501 B2 | 12/2006 | Mandal et al. | |
| 7,174,370 B1 | 2/2007 | Saini et al. | |
| 7,197,559 B2 | 3/2007 | Goldstein et al. | |
| 7,200,588 B1 | 4/2007 | Srivastava et al. | |
| 7,203,697 B2* | 4/2007 | Chang et al. | 707/102 |
| 7,203,868 B1 | 4/2007 | Evoy | |
| 7,206,827 B2* | 4/2007 | Viswanath et al. | 709/220 |
| 7,209,898 B2 | 4/2007 | Pfeiffer et al. | |
| 7,209,963 B2 | 4/2007 | Burton et al. | |
| 7,233,989 B2 | 6/2007 | Srivastava et al. | |
| 7,240,334 B1 | 7/2007 | Fluke et al. | |
| 7,251,809 B2 | 7/2007 | Barclay et al. | |
| 7,290,249 B2 | 10/2007 | Sengodan | |
| 7,293,262 B2 | 11/2007 | Sengodan | |
| 7,305,671 B2 | 12/2007 | Davidov et al. | |
| 7,412,497 B2 | 8/2008 | Viswanath et al. | |
| 7,493,624 B1 | 2/2009 | Kautzleben et al. | |
| 7,496,896 B2 | 2/2009 | Bley et al. | |
| 7,526,519 B2 | 4/2009 | Potter et al. | |
| 7,539,743 B2* | 5/2009 | Rivierre et al. | 709/223 |
| 7,546,605 B1* | 6/2009 | Kruger et al. | 719/316 |
| 7,617,289 B2 | 11/2009 | Srinivasan et al. | |
| 2002/0029298 A1* | 3/2002 | Wilson | 709/316 |
| 2002/0073063 A1 | 6/2002 | Faraj | |
| 2002/0075325 A1 | 6/2002 | Allor et al. | |
| 2002/0170036 A1 | 11/2002 | Jeffrey et al. | |
| 2002/0186238 A1 | 12/2002 | Sylor et al. | |
| 2002/0188610 A1 | 12/2002 | Spencer | |
| 2003/0005173 A1 | 1/2003 | Shah et al. | |
| 2003/0041142 A1 | 2/2003 | Zhang et al. | |
| 2003/0051102 A1 | 3/2003 | Jacobs et al. | |
| 2003/0061247 A1 | 3/2003 | Renaud | |
| 2003/0069969 A1 | 4/2003 | Renaud | |
| 2003/0110252 A1 | 6/2003 | Yang-Huffman | |
| 2003/0120593 A1 | 6/2003 | Bansal et al. | |
| 2003/0167304 A1 | 9/2003 | Zhu et al. | |
| 2003/0177477 A1 | 9/2003 | Fuchs | |
| 2003/0225851 A1 | 12/2003 | Fanshier et al. | |
| 2003/0225872 A1 | 12/2003 | Bartek et al. | |
| 2003/0236880 A1 | 12/2003 | Srivastava et al. | |
| 2004/0003122 A1 | 1/2004 | Melillo | |
| 2004/0019662 A1 | 1/2004 | Viswanath et al. | |
| 2004/0019669 A1 | 1/2004 | Viswanath et al. | |
| 2004/0022237 A1 | 2/2004 | Elliott et al. | |
| 2004/0028059 A1 | 2/2004 | Josyula et al. | |
| 2004/0031020 A1 | 2/2004 | Berry et al. | |
| 2004/0058652 A1 | 3/2004 | McGregor et al. | |
| 2004/0064552 A1 | 4/2004 | Chong et al. | |
| 2004/0073782 A1 | 4/2004 | Price et al. | |
| 2004/0078722 A1 | 4/2004 | Pfeiffer et al. | |
| 2004/0123279 A1 | 6/2004 | Boykin et al. | |
| 2004/0148610 A1 | 7/2004 | Tsun et al. | |
| 2004/0154011 A1 | 8/2004 | Wang et al. | |
| 2004/0158837 A1 | 8/2004 | Sengodan | |
| 2004/0215649 A1 | 10/2004 | Whalen et al. | |
| 2004/0230973 A1* | 11/2004 | Cundiff et al. | 718/1 |
| 2004/0244001 A1* | 12/2004 | Haller et al. | 718/100 |
| 2004/0249613 A1 | 12/2004 | Sprogis et al. | |
| 2004/0268314 A1 | 12/2004 | Kollman et al. | |
| 2005/0010608 A1 | 1/2005 | Horikawa | |
| 2005/0022157 A1 | 1/2005 | Brendle et al. | |
| 2005/0028171 A1 | 2/2005 | Kougiouris et al. | |
| 2005/0033777 A1 | 2/2005 | Moraes et al. | |
| 2005/0038889 A1 | 2/2005 | Frietsch | |
| 2005/0039171 A1 | 2/2005 | Arra et al. | |
| 2005/0039187 A1 | 2/2005 | Avakian et al. | |
| 2005/0097110 A1 | 5/2005 | Nishanov et al. | |
| 2005/0132041 A1 | 6/2005 | Kundu | |
| 2005/0132337 A1 | 6/2005 | Wedel et al. | |
| 2007/0226359 A1 | 9/2007 | Gunduc et al. | |

FOREIGN PATENT DOCUMENTS

| | | |
|---|---|---|
| JP | 2002073522 | 3/2002 |
| JP | 2002082777 | 3/2002 |
| WO | WO 0205102 A1 | 1/2002 |
| WO | WO 0241154 A2 | 5/2002 |

OTHER PUBLICATIONS

"EarlyAdopter_DS.pdf, Bibliographic Data for "Early Adopter: J2SE 1.4"", *by Wrox Press* 1 pg.

"Adding Systems to the Availability Monitoring Manually", http://help.sap.com/saphelp_erp2004/helpdata/en/38/9e0fe5d7980fffe10000009b3810a5/c..., Adding Systems to the Availability Monitoring Manually (SAP Library—The Alert Monitoring), (Downloaded Dec. 14, 2004), Whole Document.
"Alert Monitoring of the J2EE Engine Using CCMS", http://help.sap.com/saphelp_webas630//helpdata/en/92/ef30241c0f4a41959390a27e286ce..., Alert Monitoring of the J2EE Engine Using CCMS—SAP Library, (Downloaded Dec. 14, 2004), Whole Document.
"Availability and Performance Overview Monitor", http://help.sap.com/saphelp_erp2004/helpdata/en/ae/cd823bd26a5c42e10000000a114084..., Availability and Performance Overview Monitor (SAP Library—The Alert Monitor), (Downloaded Dec. 14, 2004), Whole Document.
"Availability Monitoring with CCMSPING", http://help.sap.com/saphelp_erp2004/helpdata/en/38/9e3337d7840ffee10000009b3810a5/..., Availability Monitoring with CCMSPING (SAP Library—The Alert Monitor), (Downloaded Dec. 14, 2004), Whole Document.
"CCMS Agents", http://help.sap.com/saphelp_nw04/helpdata/en/48/6a76607a7c91409474ad6c7b6f5a26/frameset.htm, Whole Document.
"CCMS Monitoring Architecture: Preconfigured Monitors for the Alert Monitor", *SAP Web Application Server 6.20*, (Nov. 16, 2001), Whole Document.
"CCMS: Informix", http://help.sap.com/saphelp_erp2004/helpdata/en/73/61c850800e25478d24696196a969a5..., CCMS: Informix (SAP Library—CCMS: Informix), (Downloaded Dec. 14, 2004), Whole Document.
"Changing Monitoring Setting of Servers and Groups", http://help.sap.com/saphelp_erp2004/helpdata/en/6c/d667aa73bb9c428e9786eaf559f7ea/..., Changing Monitoring Setting of Servers and Groups (SAP Library—The Alert Monitor), (Downloaded Dec. 14, 2004), Whole Document.
"Configuring Availability Monitoring", http://help.sap.com/saphelp_erp2004/helpdata/en/38/9e100dd7980fffe10000009b3810a5/..., Configuring Availability Monitoring (SAP Library—The Alert Monitor), (Downloaded Dec. 14, 2004), Whole Document.
"Creating and Changing a Monitoring Pause", http://help.sap.com/saphelp_erp2004/helpdata/en/73/098488227c384f97c564225737108c..., Creating and Changing a Monitoring Pause (SAP Library—The Alert Monitor), (Downloaded Dec. 14, 2004), Whole Document.
"Creating and Changing Monitoring Rules", http://help.sap.com/saphelp_erp2004/helpdata/en/40/17fd8c1754324b81da9027f1bdbb75/..., Creating and Changing Monitoring Rules (SAP Library—The Alert Monitor), (Downloaded Dec. 14, 2004), Whole Document.
"Debugging J2EE Applications", *Sun Microsystems, Java—J2EE 1.4 Application Server Deveoper's Guide*, "Debugging J2EE Applications" Chapter 4, http://java.sun.com/j2ee/1.4_docs/devguide/dgdebug.html, 2003, printed Jul. 2, 2004 (11 pgs.), (2003), 11 pgs.
"How Introscope Works", *Wily Technology, Inc., Wily Solutions "How Introscope Works"—Enterprise Application Mangement*, http://www.wilytech.com/solutions/products/howWorks.html, 1999-2004, printed Jul. 2, 2004 (1 page)., (1999-2004), 1 page.
"Installing and Registering CCMS Agents", http://help.sap.com/saphelp_nw04/helpdata/en/48/6a76607a7c91409474ad6c7b6f5a26/frameset.htm SAP Library, (Downloaded Dec. 14, 2004) , Whole Document.
"Installing Availability Agent CCMSPING", http://help.sap.com/saphelp_erp2004/helpdata/en/79/498e3bae1d9e7ae10000000a114084..., Installing Availability Agent CCMSPING (SAP Library—The Alert Monitor), (Downloaded Dec. 14, 2004), Whole Document.
"Java Logging Overview", (Nov. 2001), pp. 1-9.
"Jikes Bytecode Toolkit: Overview", *Alphaworks*, www.alphaworks.ibm.com/tech/jikesbt, posted Mar. 31, 2000, 2 pages, printed Sep. 28, 2006.
"Mobile-Code Security Mechanisms for Jini", *Mobile-Code Security Mechanisms for Jini—"Mobile-Code Security Mechanisms for Mechanisms for Jini" Download code, DISCEX 2001 Paper*, http://theory.stanford.edu/people/jcm/software/jinifilter.html, printed Jul. 2, 2004—(3 pgs.), (2001), 3 pgs.
"Monitoring", http://help.sap.com/saphelp_webas630/helpdata/en/68/f4bc3deaf28d33e10000000a11405..., Monitoring (SAP Library—J2EE Technology in SAP Web Application Server), (Downloaded Dec. 14, 2004), Whole Document.
"Operating System Monitor", http://help.sap.com/saphelp_nw04/helpdata/en/55/b5b93b5bb3493fe10000000a114084/frameset.htm, SAP Library, (Downloaded Dec. 14, 2004), Whole Document.
"Package Gnu.Bytecode", *Package Gnu.Bytecode*, http://sources.redhat.com/kawa/api.gnu/bytecode/package-summary.html, 4 pages, printed Sep. 28, 2006.
"The Alert Monitor", http://help.sap.com/saphelp_nw2004s/helpdata/en/28/83493b6b82e908e10000000a11402f/content.htm, SAP Library, (Downloaded Dec. 14, 2004), Whole Document.
"The Java Object Instrumentation Environment", *Duke University*, www.cs.duke.edu/ari/joie/, last updated May 2003, printed Sep. 28, 2006, 2 pages.
"The Monitoring Architecture: Concept", http://help.sap.com/saphelp_nw04/helpdata/en/c4/3a7da1505211d189550000e829fbbd/frameset.htm, SAP Library, (Downloaded Feb. 27, 2008), Whole Document.
"The SAP J2EE Engine Monitoring Architecture", http://help.sap.com/saphelp_webas630/helpdata/en/83/6b20165833fa43b28f0349a4d3108..., The SAP J2EE Engine Monitoring Architecture (SAP Library—J2EE Technology in SAP . . . , (Downloaded Dec. 14, 2004), Whole Document.
"The Wily 5 Solution—Enterprise Aplications are Your Business", *Wily Technology, Inc., Wily Techonology, Inc., Wily Solutions "The Wily 5 Solution—Enterprise Aplications are Your Business"*, http://www.wilytech.com/solutions/ibm_family.html, 1999-2004, printed Jul. 2, 2004 (2 pgs.), (1999-2004), 2 pgs.
"Wily Introscope", *Wily Technology, Inc., Wily Solutions "Wily Introscope"—Enterprise Application Management*, http://www.wilytech.com/solutions/products/Introscope.html, 1999-2004, printed Jul. 2, 2004 (2 pgs.), (1999-2004), 2 pgs.
Affeldt, Reynald , et al., "Supporting Objects in Run-Time Bytecode Specialization", Reynald Affeldt, et al., "*Supporting Objects in Run-Time Bytecode Specialization*", *Department of Graphics and Computer Science, University of Tokyo, ASIA-PEPM '02*, Sep. 12-17, 2002, *ACM*, pp. 50-60.
Burtscher, M , "VPC3: A Fast and Effective Trace-Compression Algorithm", *ACM*, (2004), p. 167-176.
Chander, Ajay , et al., "Mobile Code Security by Java Bytecode Instrumentation", Ajay Chander et al., "Mobile Code Security by Java Bytecode Instrumentation", *Proceedings of the DARPA Information Survivability Conference & Exposition DISCEX-II 2001*, Jun. 12-14, 2001, *Stanford University and University of Pennsylvania*, * Partially supp, 14 pgs.
Chang, L. , et al., "A Network Status Monitoring System Using Personal Computer", Chang, L.; Chan, W.-L.; Chang, J.; Ting, P.: Netrakanti, M., "*A Network Status Monitoring System Using Personal Computer*", *Global Telecommunications Conference, 1989 and Exhibition. 'Communications Technology for the 1990s and Beyond'. GLOBECOM '89., IEEE*, (1989), pp. 201-206.
Cohen, Geoff A., et al., "An Architecture for Safe Bytecode Insertion", Geoff A. Cohen, et al., *Software-Practice and Experience*, [*Version: Mar. 6, 2000 v2.1*] "*An Architecture for Safe Bytecode Insertion*", Department of Computer Science, Duke University (27 pgs.).
Cohen, Geoff A., et al., "Automatic Program Tranformation with JOIE", *Paper, Departmen of Computer Science, Duke University* 12 pages.
Dahm, Markus , "Welcome to the Byte Code Engineering Library 4.4.1", http://bcel.sourceforge.net/main.html, last updated Apr. 12, 2002, 2 pages, printed Sep. 28, 2006.
Davies, Jonathan, et al., "An Aspect Oriented Performance Analysis Environment", Jonathan Davies, et al., *Proceedings of the 2nd international conference on "An Aspect Oriented Performance Analysis Environment"*, 10 pgs., 2003, Boston, Massachusetts Mar. 17-21, 2003.
Gagnon, Etienne, et al., "Effective Inline-Threaded Interpretation of Java Bytecode Using Preparation Sequences", Etienne Gagnon, et al., "*Effective Inline-Threaded Interpretation of Java Bytecode Using*

*Preparation Sequences"*, Sable Research Group, Universite du Quebec a Montreal and McGill University, Montreal. Canida, Jan. 23, 2003 (15 pgs.).
Gill, Peter W., "Probing for a Continued Validation Prototype" Peter W. Gill, *"Probing for a Continued Validation Prototype", a Thesis Submitted to the Faculty of the Worcester Polytechnic Institute*, May 2001, (111 pages)..
Goldberg, Allen , et al., "Instrumentation of Java Bytecode for Runtime Analysis", Allen Goldberg, et al., *"Instrumentation of Java Bytecode for Runtime Analysis", Fifth ECOOP Workshop on Formal Techniques for Java-like Programs*, Jul. 21, 2003, *Kestrel Technology, NASA Ames Research Center*, Moffett Field, California USA, (9 pgs.).
Hampton, Kip , "High-Performance XML Parsing with SAX", Published on XML.com by Feb. 14, 2001.
Hart, James, "Early Adopter: J2SE 1.4", *chapter 5, Wrox Press*, (Sep. 2001), pp. 1-12.
Kaplan, et al., "Flexible Reference Trace Reduction for VM Simulations", *ACM*, (2003), p. 1-38.
Keller, Ralph , et al., "Supporting the Integration and Evolution of Components Through Binary Component Adaptation", www.cs.ucsb.edu/oocsb, Sep. 9, 1997, *Technical Report TRCS97-15*, 12 pages.
Lee, Han B., "BIT: Bytecode Instrumenting Tool", *University of Colorado, Department of Computer Science 1997* 51 pages.
Lee, Han B., et al., "BIT: A Tool for Instrumenting Java Bytecodes", Han Bok Lee, et al., *"BIT: A Tool for Instrumenting Java Bytecodes", originally published in the Proceedings of the USENIX Symposium on Internet Technologies and Systems*, Monterey, California, Dec. 1997, www.usenix.org/ (11 pgs.).
Li, Wen, et al., "Collaboration Transparency in the DISCIPLE Framework", Wen Li, et al., "Collaboration Transparency in the DISCIPLE Framework", CAIP Center, Rutgers—The State University of New Jersey, Piscataway, NJ, USA, *Proceeding of the ACM International Conference on Supporting Gruop Work (Group '99)* Nov. 14-17, 1999, 10 pgs.
MacRides, Nathan , "SANS Security Essentials (GSEC) Practical Assignment Version 1.4", Nathan MacRides, *Security Techniques for Mobile Code "SANS Security Essentials (GSEC) Practical Assisgnment Version 1.4"*, Jul. 11, 2002, 11 pgs.
McLaughlin, Brett, "Tip: Set up a SAX Parser", *Published by International Business Machines Corporation* on Jul. 2, 2003.
McNamee, Dylan, et al., "Specialization Tools and Technigues for Systematic Optimization of System Software", Dylan McNamee, et al., *"Specialization Tools and Techniques for Systematic Optimization of System Software", Oregon Graduate Institute of Science & Technology, and University of Rennes/IRISA, ACM Transactions on Computer Systems*, 2001 (30 pgs.).
Nikolov, Nikolai, "Classfile Conversion Into An Organization of Objects, and Modification Thereof, To Effect Bytecode Modefication", Nikolov, Nikolai, *"Classfile Conversion Into An Organization of Objects, and Modification Thereof, To Effect Bytecode Modification"*, U.S. Appl. No. 10/750,396, Office Action mailed Sep. 5, 2006. The Offie Action, claims as they stood in the app.
Nikolov, Nikolai , "Execution of Modified Byte Code for Debugging, Testing and/or Monitoring of Object Oriented Software", Nikolai Nikolov, *"Execution of Modified Byte Code for Debugging, Testing and/or Monitoring of Object Oriented Software"*, U.S. Appl. No. 10/749,617, filed Dec. 30, 2003, Ofice Action mailed Aug. 23, 2006. The Office Action, claims as they sto.
Office Action May 30, 2008, Office Action mailed May 30, 2008 for Pending U.S. Appl. No. 10/749,733.
Ploesh, Reinhold , "Evaluation of Assertion Support for the Java Programming Language", Reinhold Ploesh, Johannes Kepler University Linz, Austria, "Evaluation of Assertion Support for the Java Programming Language", *JOT: Journal of Object Technology*, vol. 1, No. 3, *Special Issue: TOOLS USA 2002 Proceedings*, pp. 5-17, http://www.jot.fm/issues/.
Rudys, Algis , et al., "Enforcing Java Run-Time Properties Using Bytecode Rewriting", Algis Rudys, et al., *"Enforcing Java Run-Time Properties Using Bytecode Rewriting", International Symposium on Software Security* (Tokyo, Japan), Nov. 2002, *Rice University*, Houston, TX 77005. USA (16 pgs.).

Snyder, Alan, "The Essence of Objects: Concepts and Terms", *IEEE Software*, Jan. 1993, pp. 31-42, *Sunsoft, Mountain View*.
Stephenson, Ben , et al., "Characterization and Optimization of Java Applications", Ben Stephenson, et al., *"Characterization and Optimization of Java Applications" Department of Computer Science, Abstract in Western Research Forum Program & Abstracts*, p. 20, 2003.
USPTO, Non-Final Office Action for U.S. Appl. No. 10/813,788 mailed Jul. 31, 2008.
Welch, Ian, et. al., "Kava—A Reflective Java Based on Bytecode Rewriting", Ian Welch, et al., *"Kava—A Reflective Java Based on Bytecode Rewriting", SpringerLink—Verlag Berling Heidelberg 2000, Chapter, Lectures Notes in Computer Science*, W. Cazzola, et al. Editors, *Reflection and Software Engineering, LNCS*, pp. 155-167., (2000).
Wu, et al., "From Trace Generation to Visualization: A Performance Framework for Distributed Parallel Systems", *IEEE*, (2000), pp. 1-18.
Office Action mailed Jun. 4, 2008 for U.S. Appl. No. 10/750,007.
Non-Final Office Action for U.S. Appl. No. 10/750,007 Mailed Nov. 20, 2008, 21 pages.
Non-Final Office Action for U.S. Appl. No. 10/748,774 Mailed Nov. 25, 2008, 27 pages.
Final Office Action for U.S. Appl. No. 10/748,779, Mailed May 14, 2008, 15 pages.
Final Office Action for U.S. Appl. No. 10/748,774, Mailed Aug. 13, 2008, 14 pages.
Non-Final Office Action for U.S. Appl. No. 10/748,774, Mailed Feb. 21, 2008, 29 pages.
Non-Final Office Action for U.S. Appl. No. 10/749,005, Mailed Feb. 3, 2009, 16 pages.
Final Office Action for U.S. Appl. No. 10/813,788, Mailed Feb. 19, 2009, 18 pages.
Kautzlenben, Reinhold , et al., "Management Architecture and Method Employed Within a Clustered Node Configuration", U.S. Appl. No. 10/749,733, filed Dec. 30, 2003, Office Action mailed May 30, 2008.
Perry, J. S., "Java Management Extensions", O'Reilly Media, Inc., (Jun. 18, 2002), 1-30.
USPTO, "FOA Mailed Aug. 19, 2008 for U.S. Appl. No. 10/749,086", Whole Document.
USPTO, "FOA Mailed Sep. 26, 2007 for U.S. Appl. No. 10/749,086", (Sep. 26, 2007), Whole Document.
USPTO, "OA Mailed Feb. 29, 2008 for U.S. Appl. No. 10/749,086", (Feb. 29, 2008), Whole Document.
USPTO, "OA Mailed Feb. 4, 2009 for U.S. Appl. No. 10/749,086", (Feb. 4, 2009), Whole Document.
USPTO, "OA Mailed May 31, 2007 for U.S. Appl. No. 10/749,086", (May 31, 2007), Whole Document.
USPTO, "Office Action", U.S. Appl. No. 10/748,779, mailed Sep. 26, 2008. 16 pages.
Final Office Action for U.S. Appl. No. 10/748,779, Mailed Apr. 16, 2009, 13 pages.
Final Office Action for U.S. Appl. No. 10/749,740, Mailed Apr. 15, 2009, 22 pages.
Notice of Allowance for U.S. Appl. No. 10/748,951, Mailed Apr. 20, 2009, 26 pages.
Non-Final Office Action for U.S. Appl. No. 10/833,769 dated May 28, 2009; 10 pages.
Final Office Action mailed Jun. 11, 2008, for U.S. Appl. No. 10/749,005, filed Dec. 30, 2003. 13 pages.
Final Office Action mailed Aug. 10, 2007, for U.S. Appl. No. 10/749,005, filed Dec. 30, 2003. 8 pages.
Office Action mailed Jan. 4, 2008, for U.S. Appl. No. 10/749,005, filed Dec. 30, 2003. 10 pages.
Office Action mailed Feb. 26, 2007, for U.S. Appl. No. 10/749,005, filed Dec. 30, 2003. 10 pages.
Final Office Action for U.S. Appl. No. 10/750,007, Mailed Jul. 14, 2009, 14 pages.

Final Office Action for U.S. Appl. No. 10/749,086, Mailed Jul. 29, 2009, 11 pages.
Final Office Action for U.S. Appl. No. 10/749,005, Mailed Aug. 3, 2009, 10 pages.
Final Office Action for U.S. Appl. No. 10/748,774, Mailed Jan. 13, 2010, 14 pages.

Sun Microsystems, "Java Management Extensions Instrumentation and Agent Specification, v1.0. May 3, 2000.".
Final Office Action for U.S. Appl. No. 10/833,769 Mailed Aug. 8, 2010, 13 Pages.

* cited by examiner

MULTI-SERVICE MANAGEMENT ARCHITECTURE EMPLOYED WITHIN A CLUSTERED NODE CONFIGURATION

BACKGROUND

1. Field of the Invention

This invention relates generally to the field of data processing systems. More particularly, the invention relates to a notification architecture employed within a clustered node configuration.

2. Description of the Related Art

Multi-Tier Enterprise Application Systems

Traditional client-server systems employ a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

Although multi-tiered systems such as that illustrated in FIG. 1b provide a more flexible and scalable architecture, they are extremely complex and difficult to manage. For example, providing management capabilities for multiple clusters of presentation layer servers, business layer servers and databases, and the dependencies between them requires a significant amount of administration overhead. In fact, many enterprise networks today employ a patchwork of incompatible and/or proprietary management software, resulting in a burden on end users and network administrators. While new management technologies such as the Java Management Extensions ("JMX") specification provide improved integration of management features, these technologies fail to address certain characteristics of large enterprise systems. Accordingly, new technologies which simplify the management of large enterprise networks are desirable.

SUMMARY

A monitoring system is described which simplifies the management of complex, multi-tiered networks such as those used in large enterprises. One embodiment of the system is implemented on a cluster of application servers which are communicatively coupled together on a network to serve applications over the network to a plurality of clients. One embodiment of the monitoring system is built from a group of services. An administration service generates a plurality of runtime management beans ("MBeans") on each of the server nodes of the cluster and associates each of the runtime MBeans with specified server node resources. In addition, in one embodiment, a notification service generates cluster-wide notifications in response to certain specified events associated with certain resources of certain MBeans. The notification service distributes the notifications across all, or a subset of, the server nodes of the cluster. In addition, a monitor service generates monitor MBeans corresponding to selected runtime MBeans. The monitor MBeans are arranged in a hierarchical tree structure and are configured to receive monitoring data from associated runtime MBeans.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing multiple application server clusters using a central management arrangement. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Java Management Extensions ("JMX")

In many modern computing systems and networks, including those described above which utilize complex, multi-tier architectures, monitoring of system resources and components is of significant importance to ensure not only the reliability and security of information flow, but also to promptly detect system deficiencies so that they are corrected in a timely manner. The Java Management Extensions ("JMX") specification defines an architecture for application and network management and monitoring in a J2EE environment. Using JMX, developers of Java technology-based applications can instrument Java platform code, create smart agents and managers in the Java programming language, and implement distributed management functionality into existing systems.

Figure 1A:
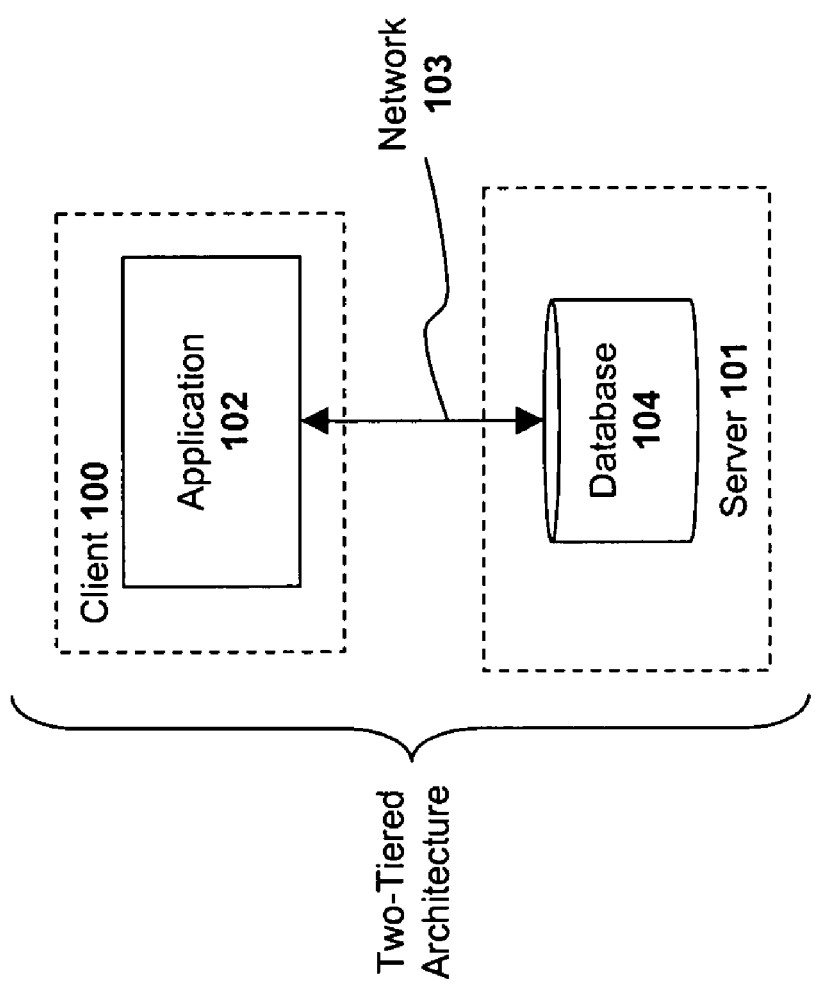
FIG. 1a illustrates a traditional two-tier client-server architecture.
Figure 1B:
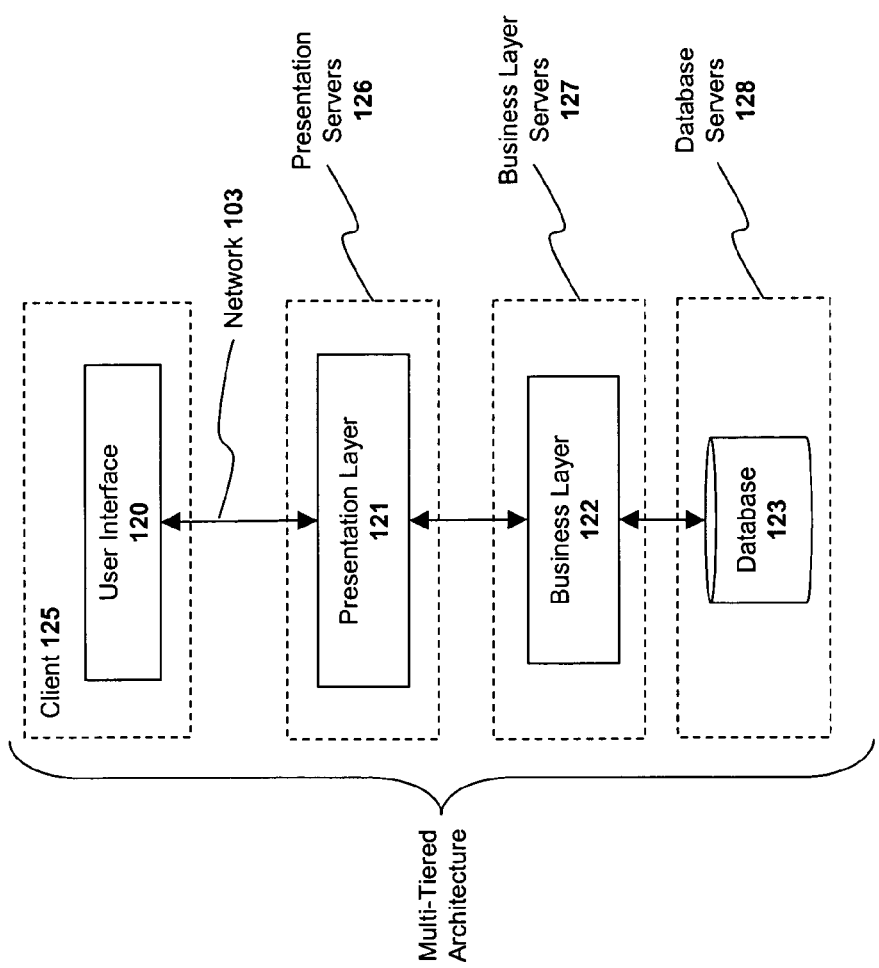
FIG. 1b illustrates a prior art multi-tier client-server architecture.
Figure 2:
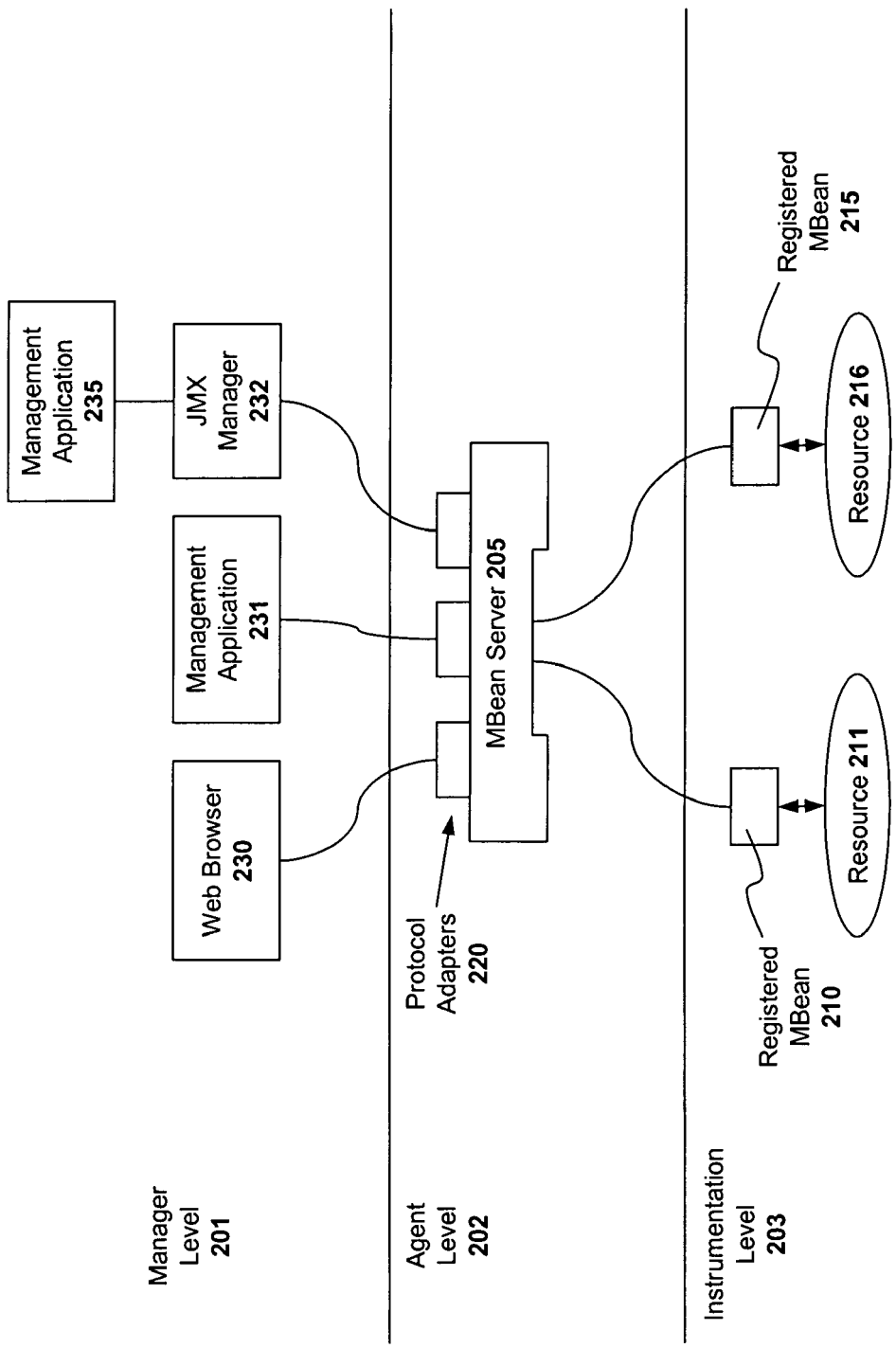
FIG. 2 illustrates the various levels of the Java Management Extensions ("JMX") architecture.

As illustrated in FIG. 2, the JMX architecture is divided into three levels: an "instrumentation" level 293; an "agent" level 202; and a "manager" level 201. At the instrumentation level 203, Java management beans ("MBeans") 210, 215 are used to manage manageable system resources 211, 216, respectively. A "manageable" resource is a resource that has been instrumented in accordance with the JMX instrumentation-level specification. By way of example, a manageable resource may include components of a business application, a device, or the implementation of a service or policy. MBeans 210, 215 are Java objects that represent the JMX manageable resources 211, 216.

An MBean server 205 at the agent level 202 is a registry for MBeans. A JMX "agent" is composed of an MBean server 205, a set of MBeans 210, 215 registered with the MBean server 205 (i.e., representing managed resources 211, 216), and one or more protocol adaptors and/or connectors 220. The MBean server 205 is a J2EE component which provides services that allow the manipulation of MBeans. All management operations performed on MBeans are performed via the MBean server 205.

The manager level 201 provides management components that can operate as a manager or agent for distribution and consolidation of management services. Different management interfaces may be employed at the management level such as Web Browsers 230 and/or proprietary management applications 231, 235. JMX managers 232 implemented within the manager level 201 provide an interface for management applications to interact with the agent, distribute or consolidate management information, and provide security.

A detailed description of the JMX Specification can be obtained from Sun Microsystems.

An Exemplary Application Server System

In one embodiment of the invention, the management techniques which are the focus of this application are used to manage resources within a cluster of application servers. An exemplary application server architecture will now be described, followed by a detailed description of the management architecture and associated processes.

Figure 3:
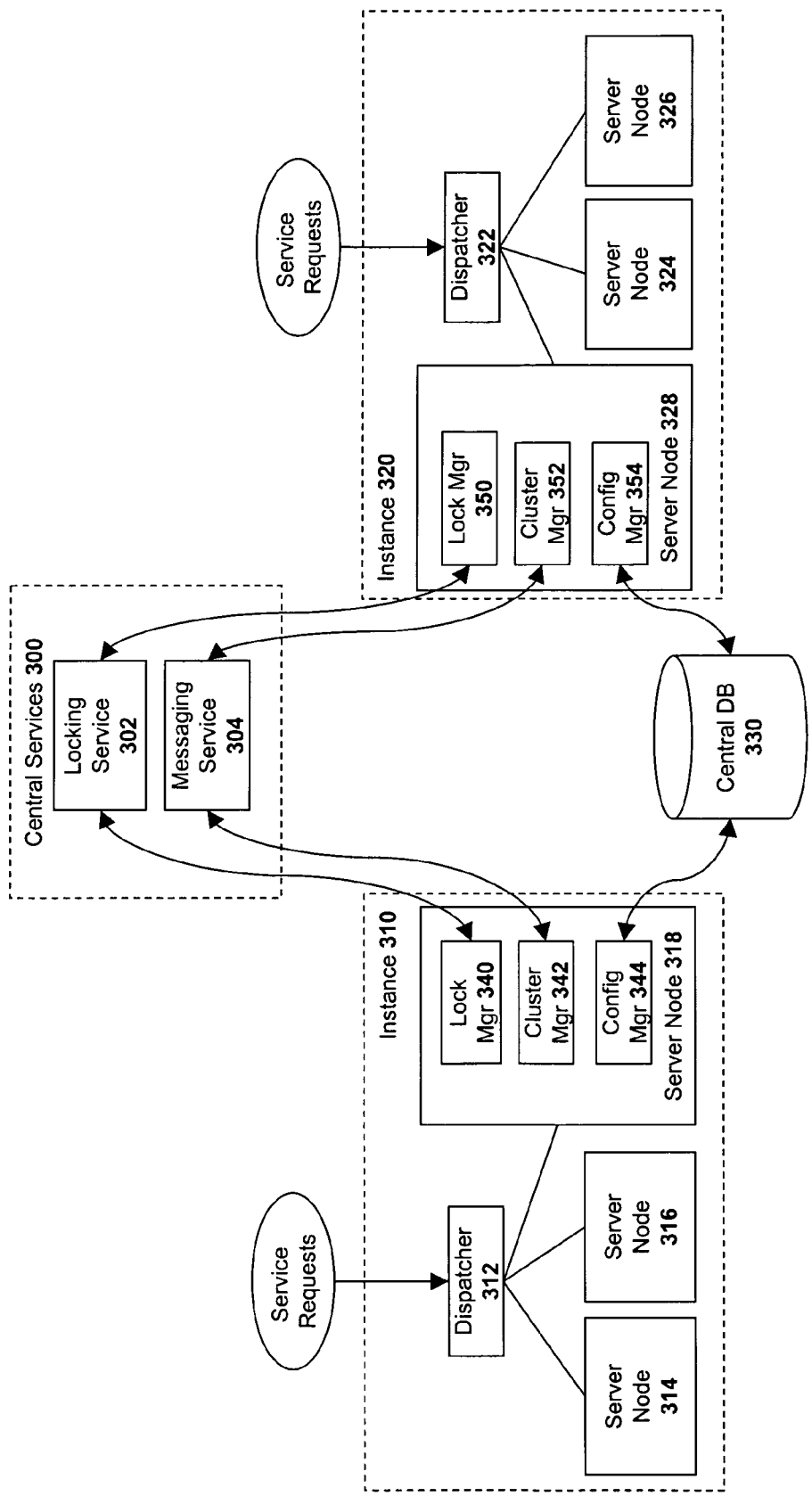
FIG. 3 illustrates a clustered application server architecture on which embodiments of the invention are employed.

An application server architecture employed in one embodiment of the invention is illustrated in FIG. 3. The architecture includes a central services "instance" 300 and a plurality of application server "instances" 310, 320. As used herein, the application server instances, 310 and 320, each include a group of server nodes 314, 316, 318 and 324, 326, 328, respectively, and a dispatcher, 312, 322, respectively. The central services instance 300 includes a locking service 302 and a messaging service 304 (described below). The combination of all of the application instances 310, 320 and the central services instance 300 is referred to herein as a "cluster." Although the following description will focus solely on instance 310 for the purpose of explanation, the same principles apply to other instances such as instance 320.

The server nodes 314, 316, 318 within instance 310 provide the business and/or presentation logic for the network applications supported by the system. Each of the server nodes 314, 316, 318 within a particular instance 310 may be configured with a redundant set of application logic and associated data. In one embodiment, the dispatcher 310 distributes service requests from clients to one or more of the server nodes 314, 316, 318 based on the load on each of the servers. For example, in one embodiment, the dispatcher 210 implements a round-robin policy of distributing service requests (although various alternate load balancing techniques may be employed).

In one embodiment of the invention, the server nodes 314, 316, 318 are Java 2 Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of the instances 310, 320 is enabled via the central services instance 300. As illustrated in FIG. 3, the central services instance 300 includes a messaging service 304 and a locking service 302. The message service 304 allows each of the servers within each of the instances to communicate with one another via a message passing protocol. For example, messages from one server may be broadcast to all other servers within the cluster via the messaging service 304. In addition, messages may be addressed directly to specific servers within the cluster (i.e., rather than being broadcast to all servers).

In one embodiment, the locking service 302 disables access to (i.e., locks) certain specified portions of configuration data and/or program code stored within a central database 230. A locking manager 340, 350 employed within the server nodes locks data on behalf of various system components which need to synchronize access to specific types of data and program code (e.g., such as the configuration managers 344, 354 illustrated in FIG. 3). As described in detail below, in one embodiment, the locking service 302 enables a distributed caching architecture for caching copies of server/dispatcher configuration data.

In one embodiment, the messaging service 304 and the locking service 302 are each implemented on dedicated servers. However, the messaging service 304 and the locking service 302 may be implemented on a single server or across multiple servers while still complying with the underlying principles of the invention.

As illustrated in FIG. 3, each application server (e.g., 318, 328) includes a lock manager 340, 350 for communicating with the locking service 302; a cluster manager 342, 352 for communicating with the messaging service 204; and a configuration manager 344, 354 for communicating with a central database 230 (e.g., to store/retrieve configuration data). Although the lock manager 340, 350, cluster manager 342, 352 and configuration manager 344, 354 are illustrated with respect to particular server nodes, 318 and 328, in FIG. 3, each of the server nodes 314, 316, 324 and 326 and/or on the dispatchers 312, 322 may be equipped with equivalent lock managers, cluster managers and configuration managers.

Figure 4:
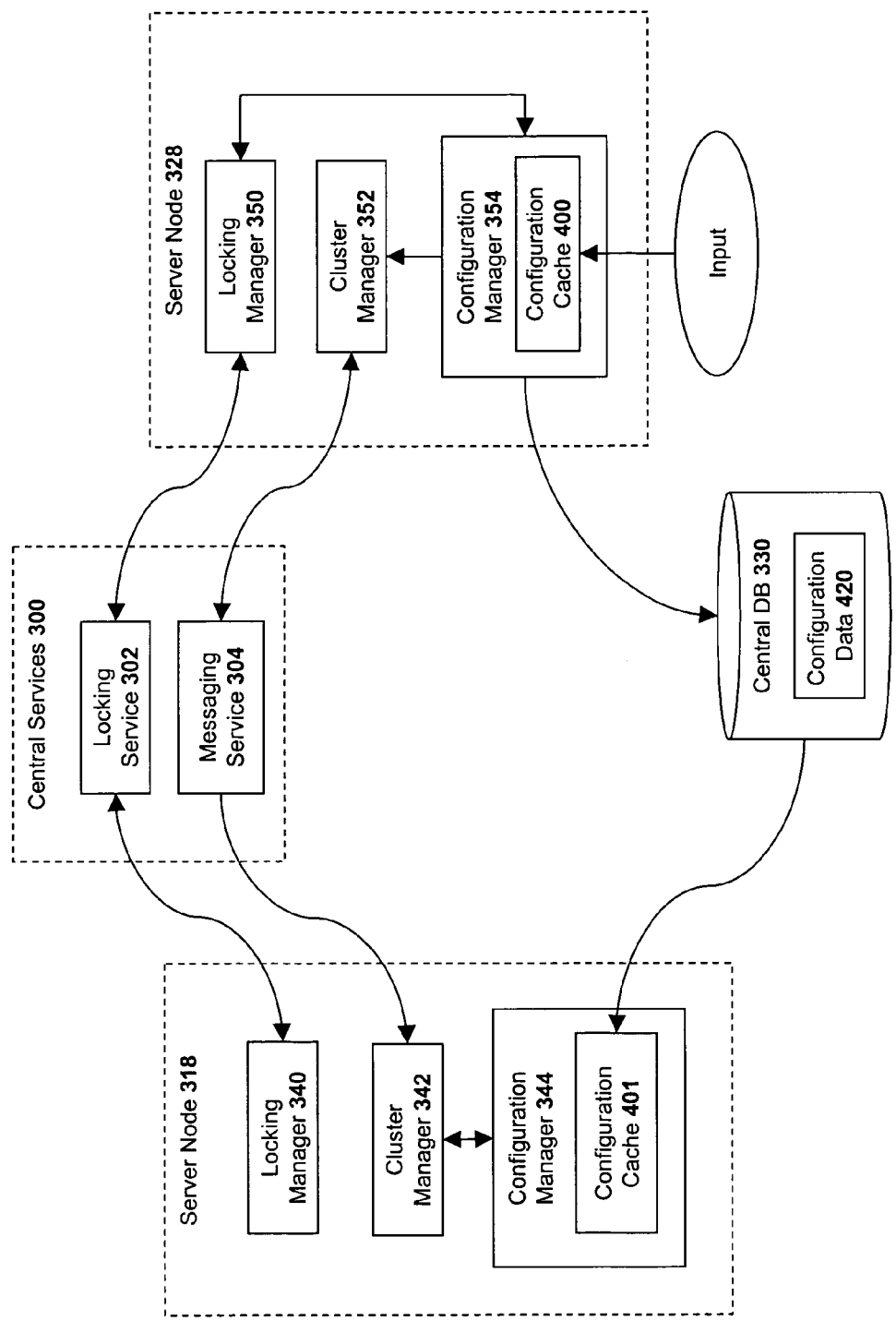
FIG. 4 illustrates one embodiment of the invention in which configuration data is cached across multiple cluster nodes.

Referring now to FIG. 4, in one embodiment, configuration data 420 defining the configuration of the central services instance 300 and/or the server nodes and dispatchers within instances 310 and 320, is stored within the central database 230. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc); information related to the network management configuration for each server/dispatcher (e.g., as described below); and various other types of information related to the cluster.

In one embodiment of the invention, to improve the speed at which the servers and dispatchers access the configuration data, the configuration managers 344, 354 cache configuration data locally within configuration caches 400, 401. As such, to ensure that the configuration data within the configuration caches 400, 401 remains up-to-date, the configuration managers 344, 354 may implement cache synchronization policies.

Figure 5:
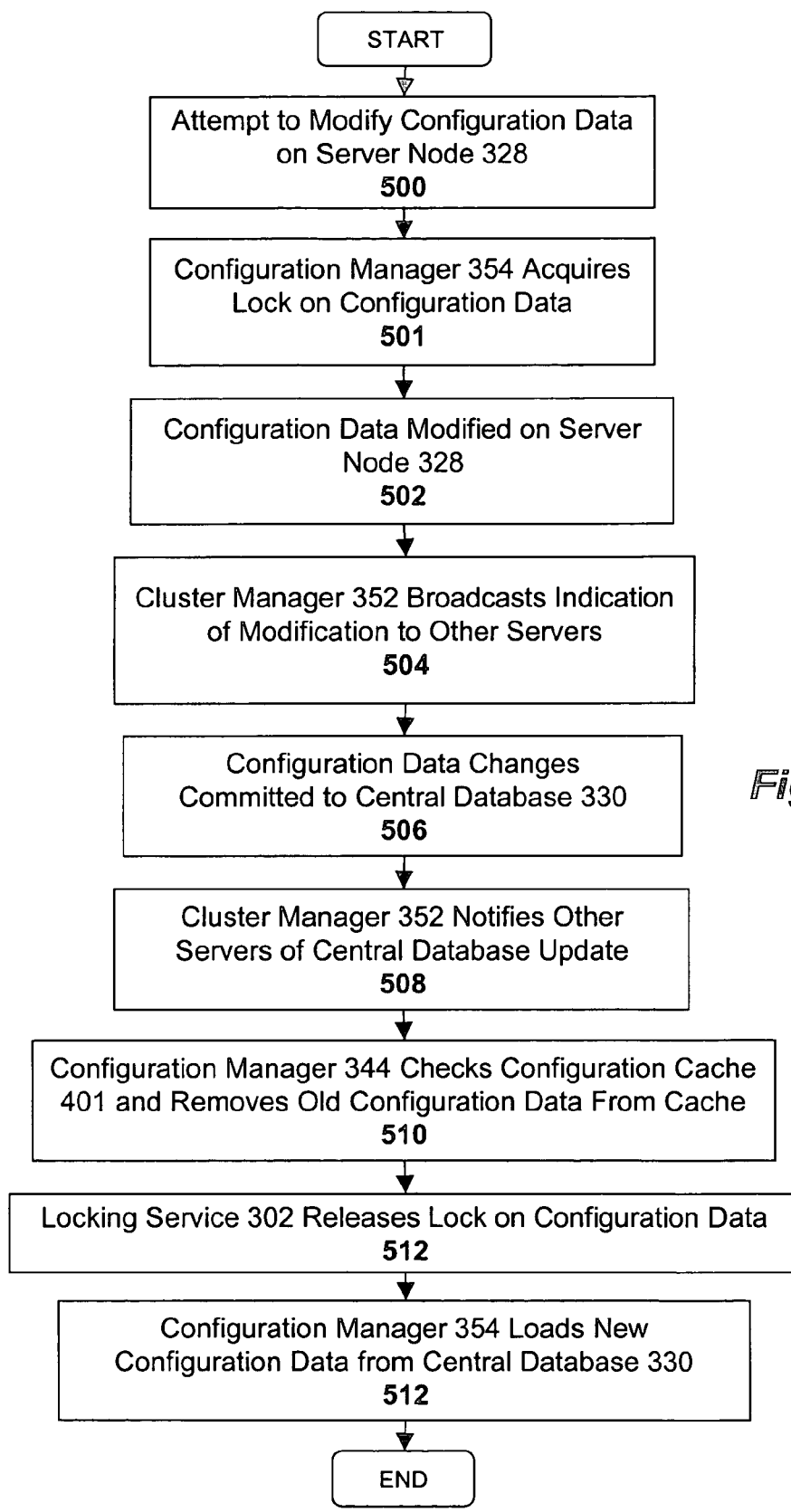
FIG. 5 illustrates a process for maintaining up-to-date configuration data at each of the cluster nodes.

One embodiment of a method for synchronizing configuration data across each of the application server instances 310, 320 and the central services instance 300 is illustrated in FIG. 5. It is assumed initially that certain portions of the configuration data from the central database is cached locally within configuration cache 400 and configuration cache 401.

At 400 (FIG. 4), a user or network administrator attempts to modify the configuration data stored within configuration cache 300 on application server 328. In response, the configuration manager 354 attempts to acquire a lock on the relevant portions of the configuration data by transmitting a lock request to the locking service 302. If the configuration data is not being currently modified by another transaction, then the locking service locks the configuration data on behalf of the configuration manager 354. Once locked, the configuration managers 344 of other server nodes 318 will not be permitted to access or acquire a lock on the configuration data.

At 502, the configuration data within the configuration cache 400 of application server 328 is modified. At 504, the cluster manager 352 broadcasts an indication of the modified data to the cluster manager 342 on server node 318 and the cluster manager of other server nodes (i.e., via the messaging service 304). At 506, the modifications to the configuration data are committed to the central database 230. At 508, the cluster manager 352 notifies the cluster manager 342 on server node 318 and the cluster managers of other server nodes of the central database update. In response, the configuration manager 344 invalidates the modified configuration data from its cache 401 and, at 512, loads the new configuration data from the central database 230. In one embodiment, the configuration manager 344 only downloads the portion of the configuration data which has been modified (i.e., rather than the entire set of configuration data). To determine whether it needs to update its configuration data, the configuration manager 344 compares the version of its configuration data with the version of the configuration data stored the central database.

Embodiments of a Management Architecture

In one embodiment of the invention, a management architecture specifically adapted to a clustered enterprise environment is employed within the application server system described with respect to FIGS. 3-5. Specifically, in one embodiment, each server, dispatcher, and/or central services instance (referred to generally as "nodes") within the system is provided with a dedicated MBean server to register MBeans for monitoring specified system resources.

Virtually any type of system resource may be monitored in this manner including, but not limited to application resources, kernel resources, services, managers, components, interfaces and libraries associated with the individual nodes within the system. By way of example, within a J2EE engine, state information related to memory management, thread management, locking and licensing may be of particular importance. Once collected, this information may be combined and provided in a comprehensive manner to the end user or system administrator.

Figure 6:
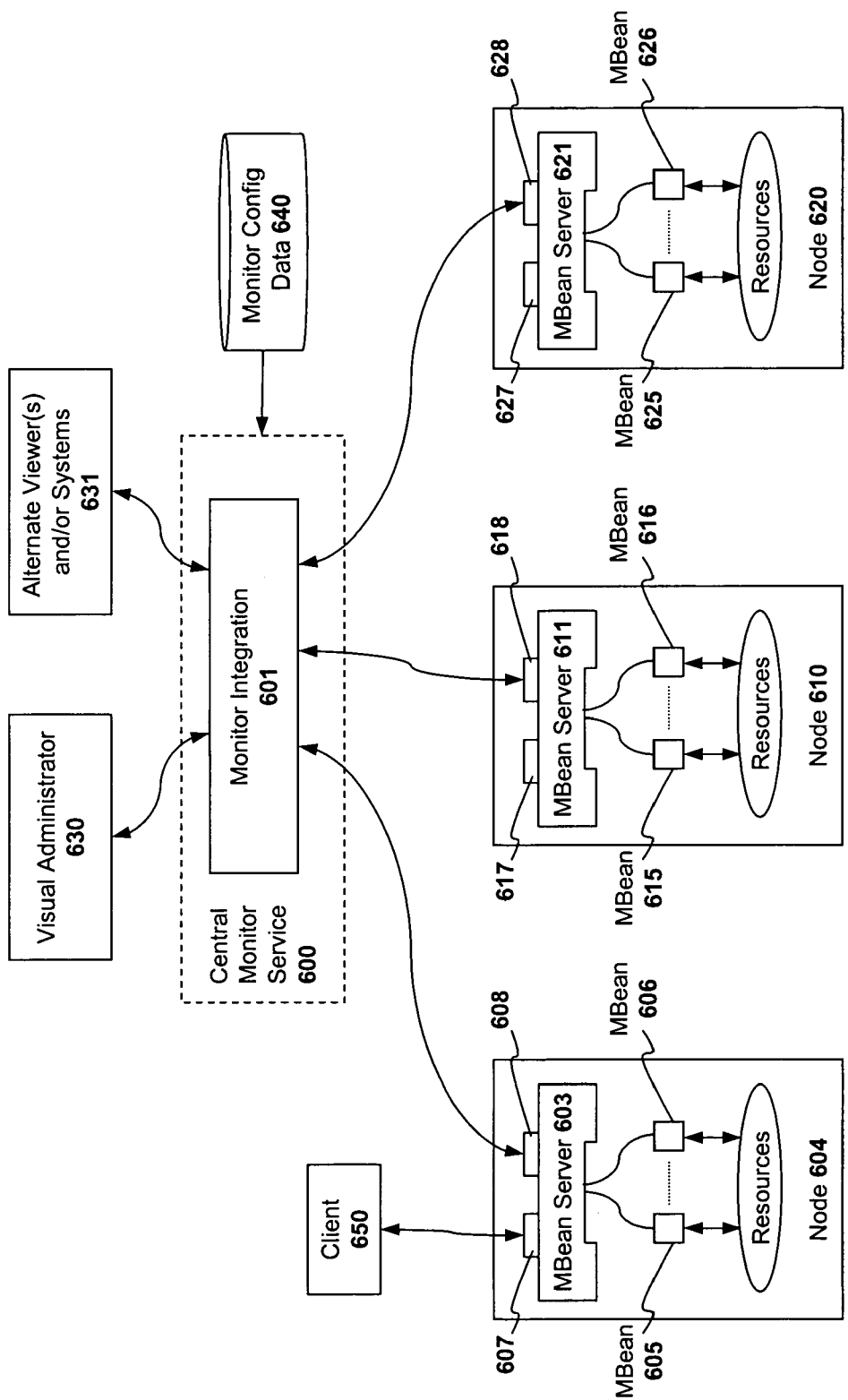
FIG. 6 illustrates a central monitor service with monitor integration logic according to one embodiment of the invention.

FIG. 6 illustrates an exemplary embodiment of the invention in which resource information is monitored on different cluster nodes 604, 610 and 620. The cluster nodes 604, 610 and 620 may represent any of the different types of nodes illustrated in FIGS. 3-4 including, for example, dispatchers 312, server nodes 318 and/or central services nodes 300.

In the illustrated embodiment, separate MBean servers 603, 611, and 621, are executed on each of the nodes 604, 610, and 620, respectively. Different types of MBeans may register with each of the MBean servers to monitor different types of system/node resources. For the purpose of illustration, only two MBeans are shown registered with each MBean server in FIG. 6. Specifically, MBeans 605 and 606 are registered with MBean server 603 on node 604; MBeans 615 and 616 are registered with MBean server 611 on node 610; and MBeans 625 and 626 are registered with MBean server 621 on node 620. It will be appreciated that, in an actual implementation, significantly more MBeans may be registered with each MBean server and a significantly greater number of nodes may be employed on the system.

In one embodiment, a central monitoring service 600 employed within the distributed configuration hides the clusterization of the various MBean servers and provides a unified view of managed resources at the manager level 201. Specifically, monitor integration logic 601 associated with the central monitoring service 600 combines the monitoring data collected from each of the individual MBean servers 603, 611, 621 and generates an comprehensive, logical view of the monitored resources. The monitoring data may then be displayed on a visual administrator 630 and/or any other type of graphical user interface 631 (e.g., such as a standard Web browser). In one embodiment, the integration logic 601 combines the monitoring data based on monitor configuration information 640 (e.g., node layout, monitoring parameters, . . . etc) stored within the central database 230. As described below with respect to FIG. 8a-b, in one embodiment, the monitor integration logic 601 includes monitor MBeans arranged in a logical monitor tree hierarchy.

The central monitor service 600, clients 650 and/or any other module/object may communicate with the MBean servers 603, 611, 621 via protocol adapters and/or connectors, represented in FIG. 6 as blocks 607, 608, 617, 618, 627, and 628. Protocol adapters and connectors are similar in that they serve the same general purpose—i.e., to expose an MBean server to managing entities. The primary difference between them is how they accomplish this task. Protocol adapters generally listen for incoming messages that are constructed in a particular protocol (e.g., such as like HTTP or SNMP). As such, protocol adapters are comprised of only one component that resides in the MBean server. For example, if client 650 is a browser-equipped client, it may communicate with the MBean server 603 via an HTTP protocol adapter 650.

By contrast, connectors are generally comprised of two components, one which resides on the MBean server and the other which resides on the client-side applications. Thus, connectors hide the underlying protocol being used to contact the MBean server (i.e., the entire process happens between the connector's two components). Throughout this detailed description, it is assumed that communication with an MBean server occurs via a protocol adapter and/or connector of that MBean server, notwithstanding the fact that the protocol adapter/connector may not be explicitly described or illustrated.

Figure 7A:
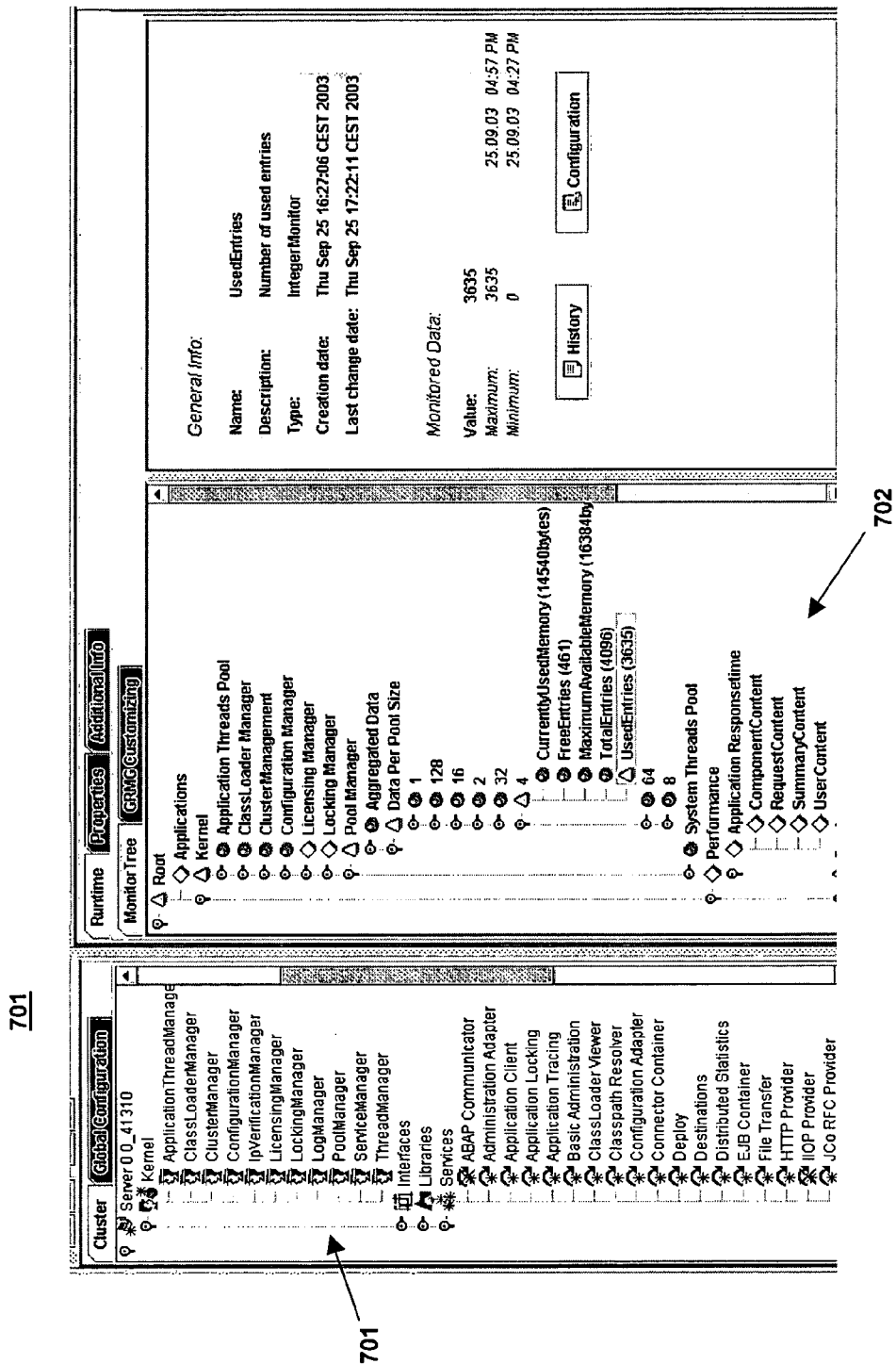
FIGS. 7a-b illustrate a graphical visual administrator used for viewing monitor data according to one embodiment of the invention.

FIG. 7a illustrates an exemplary monitor viewer 700 for navigating through resource information collected and compiled by the central monitoring service 600. The monitor viewer includes a first window 701 containing a hierarchical representation of each system node (e.g., "Server 0 0_41310"). Under each node entry is a set of categories related to that node. For example, entries for "Kernel," "Interfaces," "Libraries" and "Services" are shown under Server 0 0_41301. When a user selects a particular node in the first window 701, a hierarchical monitor tree displays monitor data related to that node in a second window 600. As described below, in one embodiment, the monitor tree is defined in the monitor configuration data 640 as interpreted by the central monitoring service.

Figure 7B:
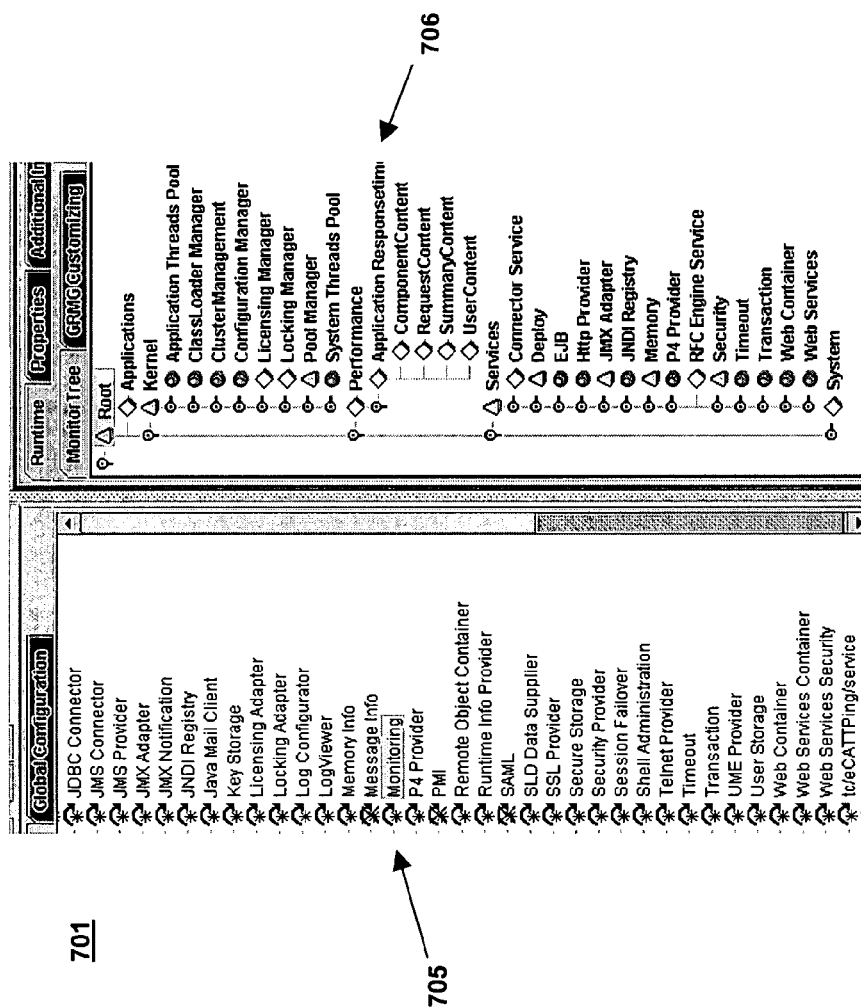

FIG. 7b illustrates another view of the monitor viewer 700 in which a global configuration tab 705 is selected in the first window. As a result, a hierarchical monitor tree 706 containing monitor data related to the entire cluster (i.e., "global" information) is displayed in the second window. Specifically, the monitor tree 706 displays global information related to applications, kernel resources, system performance criteria, and services. It should be noted, of course, that specific types of monitor data are illustrated in FIGS. 7a-b merely for the purpose of illustration. Various other types of cluster-related monitoring data may be compiled and displayed while still complying with the underlying principles of the invention.

As described above, MBeans may be used to represent and provide data related to virtually any type of system resource (e.g., a manager, service, application, . . . etc). In one embodiment of the invention, during runtime, data may either be pulled periodically from the underlying MBean/resource ("passive instrumentation") or, alternatively, the MBean/resource may be configured to push the monitoring data to the monitor service using a specified event mechanism ("active instrumentation").

Figure 8A:
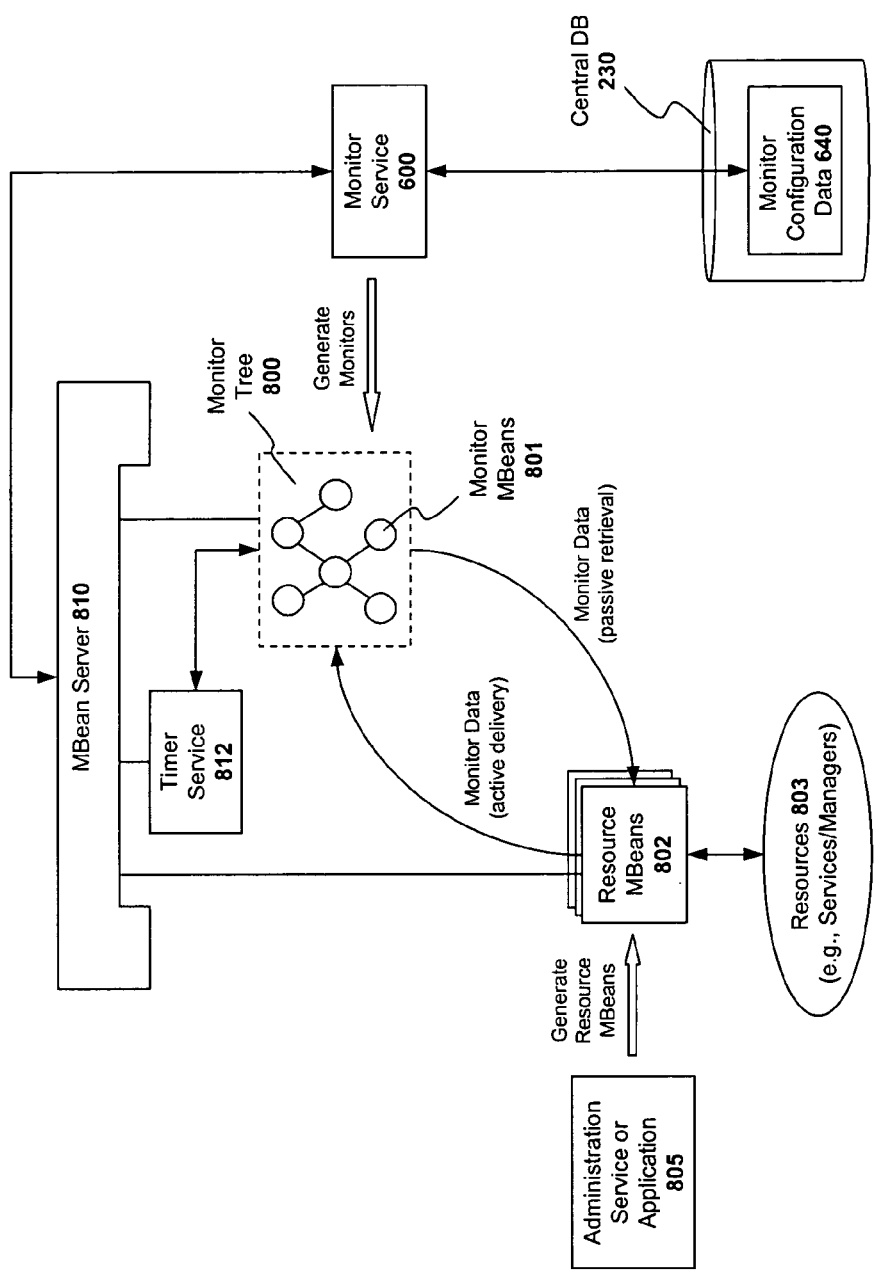
FIG. 8a illustrates a monitoring architecture according to one embodiment of the invention.

One particular embodiment, illustrated in FIG. 8a, employs two different types of MBeans to perform passive and/or active instrumentation functions: resource MBeans 802 (also referred to herein as "runtime" MBeans) and monitor MBeans 801. Resource MBeans, also referred to herein as "runtime" MBeans, are associated with the underlying system resources such as kernel resources, components, libraries, . . . etc. Monitor MBeans are generated by the central monitor service 600 and are mapped to the resource MBeans according to the monitoring configuration data 640 stored within the central database 230.

Figure 8B:
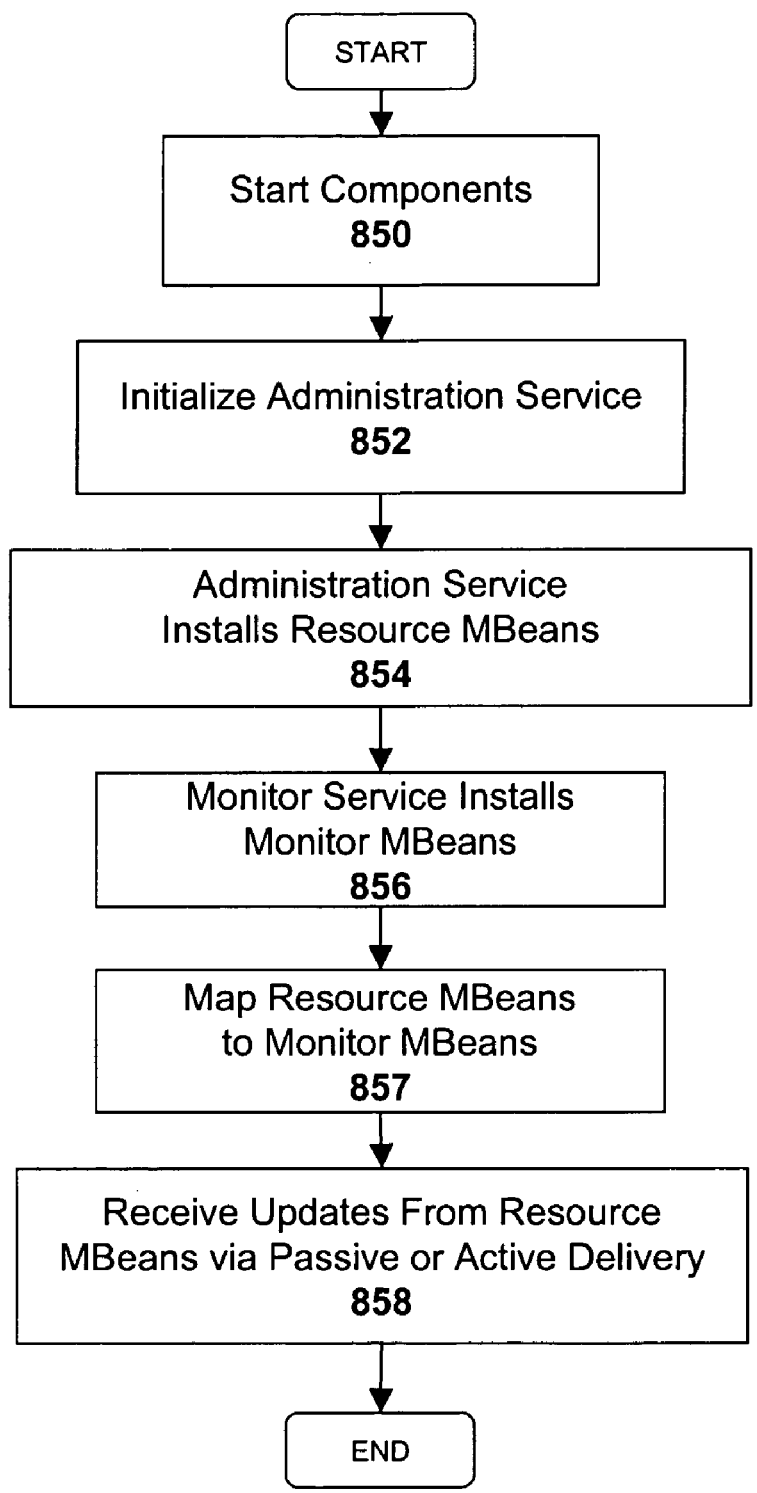
FIG. 8b illustrates one embodiment of a method for starting the monitoring architecture.

FIG. 8b illustrates a monitor initialization process utilized within the architecture of FIG. 8a. At 850, the J2EE components required to run the monitor architecture are started (e.g., the management interfaces). At 852, the components then install/initialize the administration service (or application) 805. The administration service is also illustrated and described below with respect to FIG. 13. At 854, the administration service 805 installs the resource MBeans used to monitor specified resources within each node in the cluster. In one embodiment, the administration service 805 uses the monitor configuration data 640 within the central database 230 to identify the resource MBeans to install. The administration service 805 may communicate with the central monitor service 600 throughout the initialization process to coordinate the retrieval of MBean data form the central database 230 and to coordinate the mapping of resource MBeans to monitor MBeans (as described below).

At 856, the central monitor service 600 installs the monitor MBeans 801 based on the monitor configuration data 640 stored within the central database 230. In one embodiment, the central monitor service 600 arranges the Monitor MBeans 801 within a hierarchical monitor tree 800, representing the logical relationships between the resources in each of the nodes in the cluster. As mentioned above, monitor information from the monitor tree 800 (or subsections thereof) may be displayed within a graphical visual administrator 630 or other user interface.

At 857, resource MBeans 802 are mapped to monitor MBeans 801 within the monitor tree 800, thereby establishing a link between each monitor MBean and the resource which it represents. For example, each monitor MBean 801 within the monitor tree 800 may have a resource identifier associated therewith, identifying the resource (or resource MBean) which it represents. Once the mapping is complete, the monitoring architecture is executed and, at 858, monitor updates are provided from the resource MBeans to their associated monitor MBeans. The monitor updates may then be displayed as a monitor tree within the visual administrator 630.

As mentioned above, different types of monitor updates may be employed within the system. By way of example, and not limitation, this may include string monitors which monitor text as a string value; integer monitors which monitor an 'int' value; table monitors which monitor a table containing a header and contents (e.g., wherein each header element is a string and each table element is a serializable object); state monitors which are similar to string monitors but have the additional property of assigning colors (e.g., green, yellow, red) to the string values (e.g., for indicating the state of the associated resource within the visual administrator); availability monitors which monitor a boolean value indicating whether the resource is available; frequency monitors which compute a frequency according to reported number of events given at specific times; quality rate monitors which compute an average (and actual) quality rate according to reported number of total tries and successful tries (e.g., one successful try from a total amount of 10 tries would result in a quality rate of 10%); pool monitors which monitor a pool characterized by (a) configurable values for minimum/maximum pool size, initial pool size and increment size when increasing the pool, and (b) runtime values for the number of current used objects and current pool size; and cache monitors which monitor a cache characterized by a configurable maximum cache size and/or the number of current used objects. It should be noted, however, that the foregoing examples are for the purpose of illustration only. The underlying principles of the invention are not limited to any particular monitor types.

In addition, as mentioned above, resource data may either be pulled periodically from the underlying resource MBean ("passive instrumentation") or, alternatively, the resource MBean may be configured to push the monitoring data to the monitor service using a specified event mechanism ("active instrumentation"). Different examples of resource data transmission are described below with respect to FIGS. 9a-c.

Figure 9A:
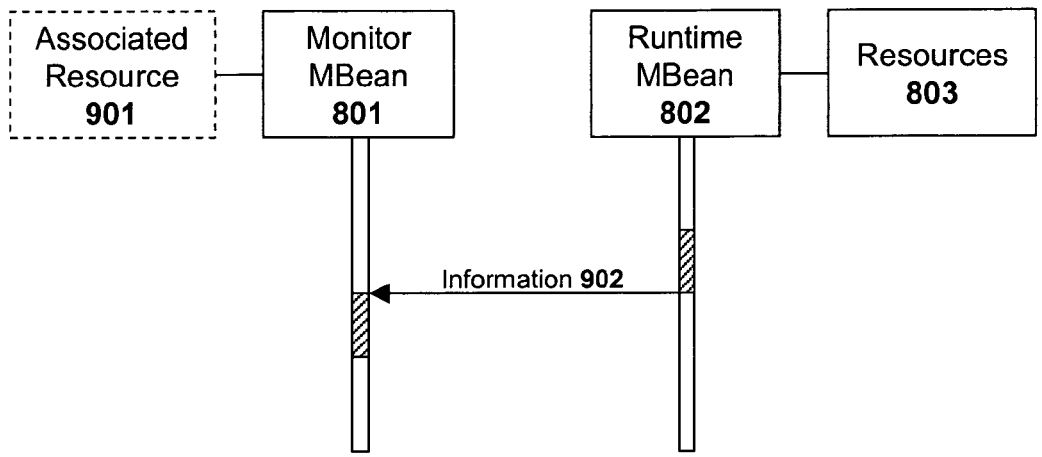
FIGS. 9a-c illustrate different data delivery paradigms employed in different embodiments of the invention.

FIG. 9a illustrates one embodiment of an "active" or "push" data delivery paradigm in which a runtime MBean 802 actively transmits monitoring data related to the resource 803 with which it is associated, without first receiving a request from the monitor MBean. For example, the runtime MBean 802 may transmit updates periodically and/or when the monitored value of the resource 803 changes by a specified amount (e.g., when it reaches a specified threshold).

Figure 9B:
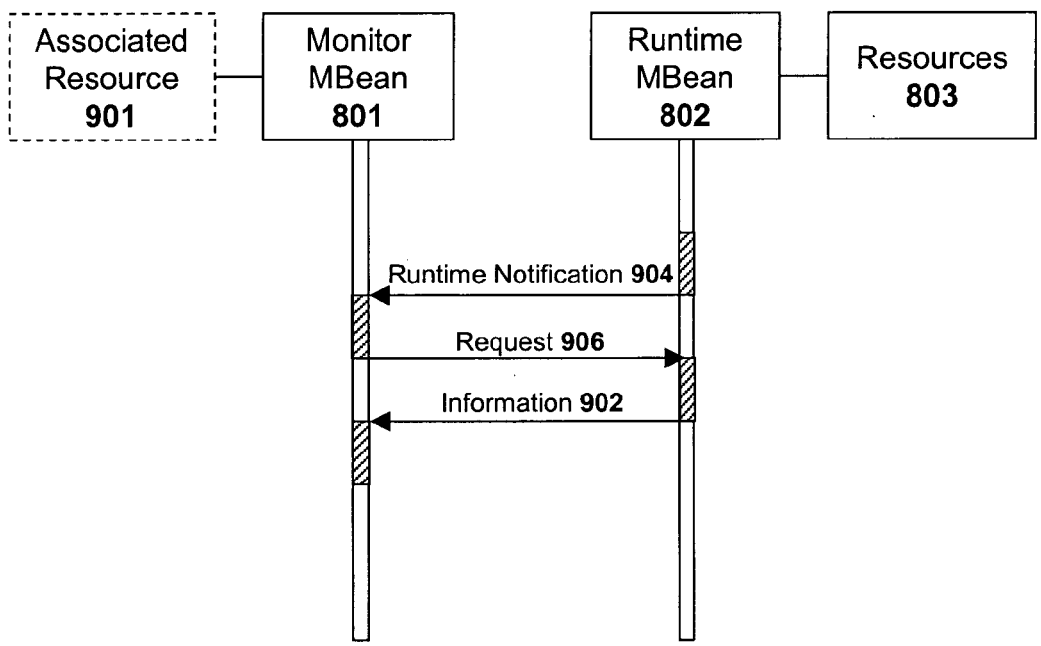

BY contrast, FIG. 9b illustrates an embodiment in which the runtime MBean 802 transmits a runtime notification 904 to the monitor bean 716, thereby notifying the monitor MBean that new monitoring data is related to the associated resource 901 is available. Upon receiving the notification 904 from the runtime MBean 802, the monitor bean 801 may send a request 906 to the runtime MBean 802 requesting the new monitoring data. In response, the runtime MBean 802 transmits the information 902 including monitoring data regarding the associated resource 901 to the monitor MBean 801.

Figure 9C:
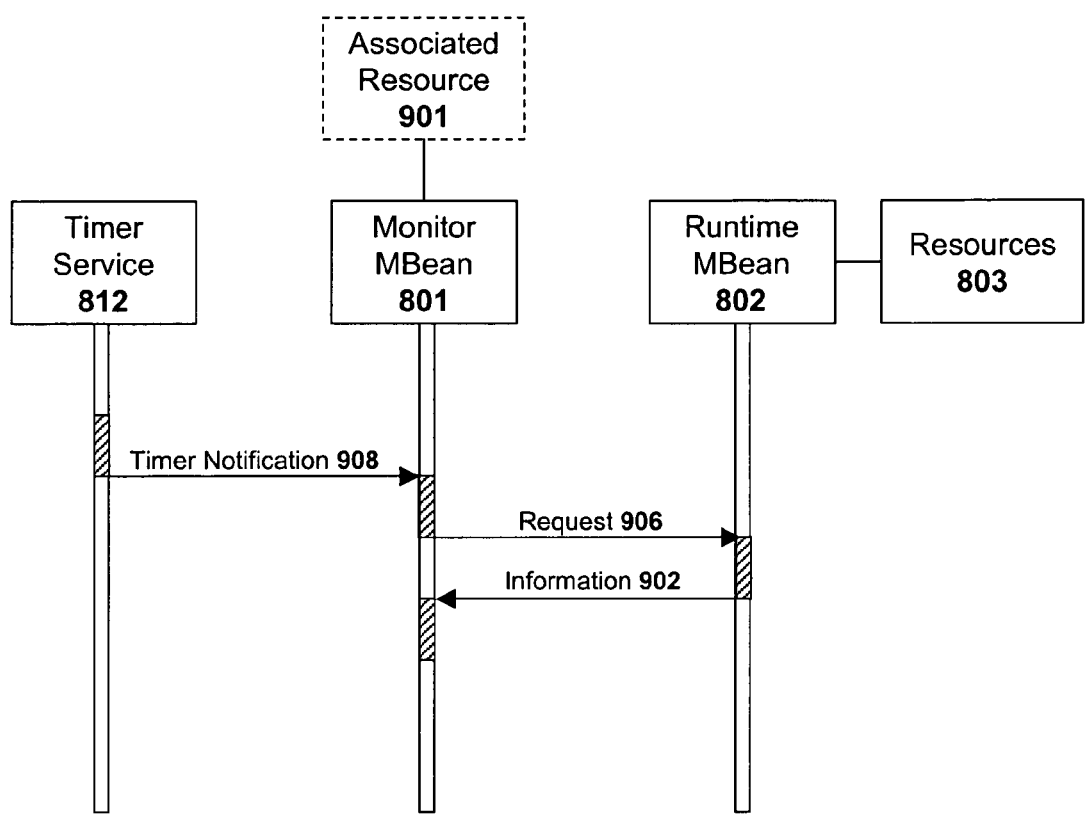

FIG. 9c illustrates an embodiment of a "passive" or "pull" paradigm in which the resource MBean 802 transmits information 902 related to its resource 803 in response to a request 906 from the monitor MBean 801. In addition, in this embodiment, the monitoring data transmission sequence may be controlled via a timer service 812 associated with the MBean server 810. For example, the timing service 812 may be programmed to trigger the monitor MBean request 906 periodically (e.g., every few seconds).

Figure 10:
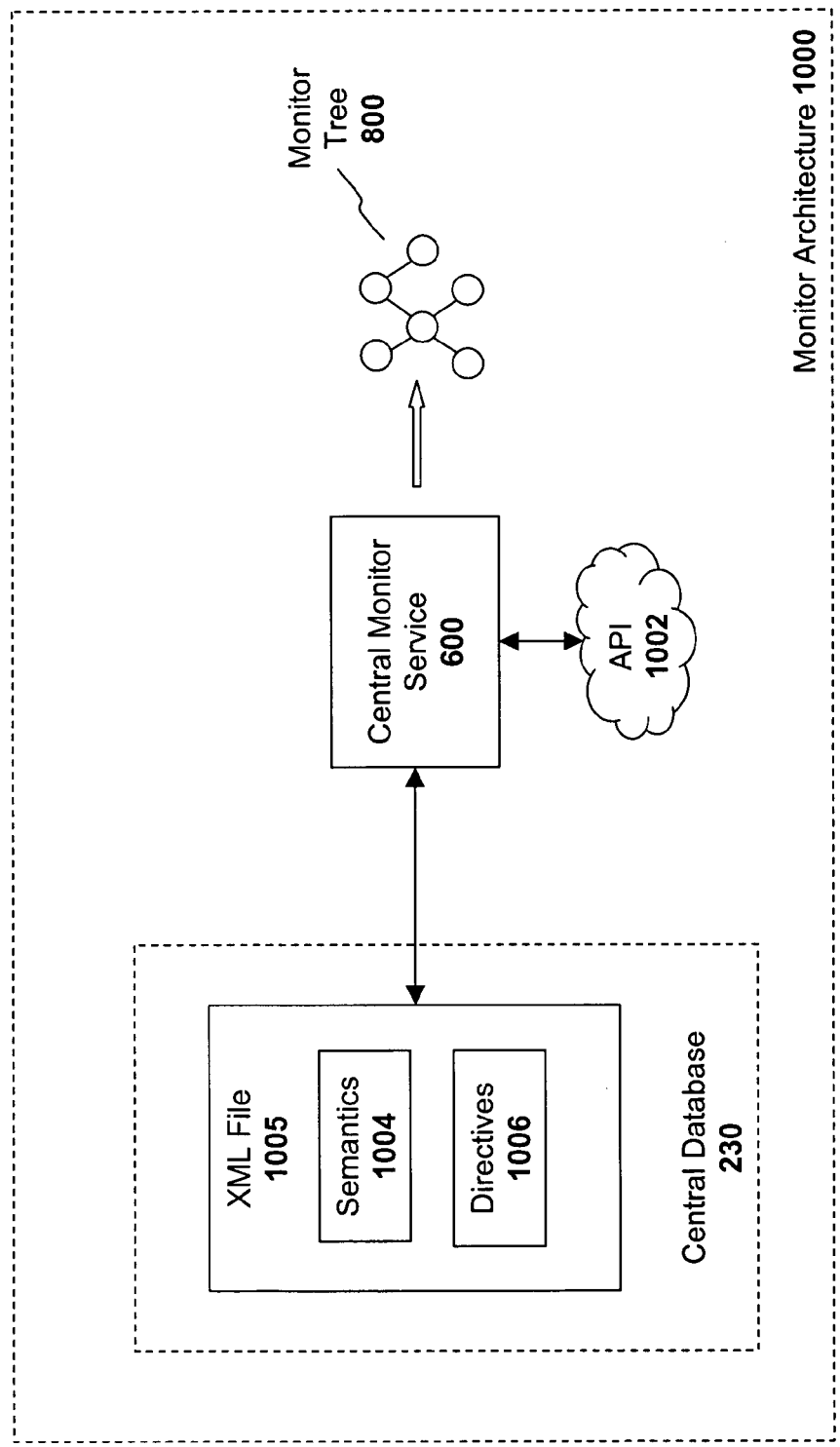
FIGS. 10-11 illustrate embodiments of the invention in which the monitor configuration data is stored within an extensible markup language ("XML") file.

FIG. 10 illustrates an embodiment in which the monitor configuration data 640 is stored in an Extensible Markup Language ("XML") format. According to this embodiment, the central monitor service 600 of the monitoring architecture 1000 generates a monitor tree 800 based on the semantics 1004 and directives 1006 of an XML file 1005 stored within the central database 230.

In one embodiment, the XML technology is integrated with a Java 2 Platform Enterprise Edition (J2EE) engine for electronic data interchange, and due to XML's characteristics of being broad and relatively easy to use. To support and build the XML technology, including the XML file 1005, in the J2EE engine, application programming interfaces ("APIs") 1002 may be employed to use the XML file 1005 to configure various components and application modules. For example, the XML file 1005 may be used to facilitate components and modules of the monitor service 600 to generate the monitor tree 800.

According to one embodiment, the API 1002 may is a Java-compliant API. Examples of Java APIs include the J2EE XML API, Java API for XML Processing ("JAXP"), Java Messaging Service ("JMS") API, Java API for XML Messaging ("JAXM"), Java Transaction API ("JTA"), Java API for XML-Remote Procedure Call ("JAX-RPC"), Java API XML Binding ("JAXB"), and Java API for XML Registries ("JAXR"), to name a few. The API 1002 may facilitate both the creation and customization of the monitor tree 800 as well as the reporting of the monitoring information and values. Multiple XML files may be used and similarly, multiple API may be used to generate the monitor tree 800.

As mentioned above, the XML file 1005 may include semantics 1004 and directives 1006 used by the monitor service 600 to generate the monitor tree 800. The semantics 1004 of the XML file 1005 comprises the primary information about the monitor tree 800, the monitor MBeans (monitor beans), and the resources to be monitored by each of the MBeans. The semantics 1004 include a code or a set of instructions for generating the monitor tree 800. The set of instructions may include, for example, the instructions for setting color-coded marks representing corresponding status of the resources within the visual administrator 630 or other graphical interface or system 631 (e.g., within the displayed monitor tree). For example, in one embodiment, a green mark indicates monitoring of the corresponding resource; a yellow mark indicates continuous monitoring of the corresponding resource, and may also indicate that the resource being monitored may be reaching a critical value or stage; and a red mark indicates that the corresponding resource may have reached a critical value. Finally, a white mark may indicate inactivity, or that the corresponding resource is not being monitored. Of course, the underlying principles of the invention are not limited to any particular set of color-coded marks.

According to one embodiment, the directives 1006 specify the form in which the monitor tree 800 is generated. Stated differently, the directives 1006 provide installation instructions on how the semantics 1004 are to be implemented. For example, the directives 1006 may include one or more templates to match various monitor beans with corresponding associated resources at various nodes of the monitor tree 800.

The monitor service 600 employs the API 1002 to generate the monitor tree 800 based on the semantics 1004 and the directives 1006.

The semantics 1004 and the directives 1006 of the XML file 1005 may include elements (e.g., similar to HyperText Markup Language ("HTML") tags) to provide context to the information contained within the XML file 1005. The XML file 1005 may be document-centric to be used by humans or data-centric to be used by another software application or module containing data extracted from a database, such as the central database 230, and may be submitted to the API 1002.

Figure 11:
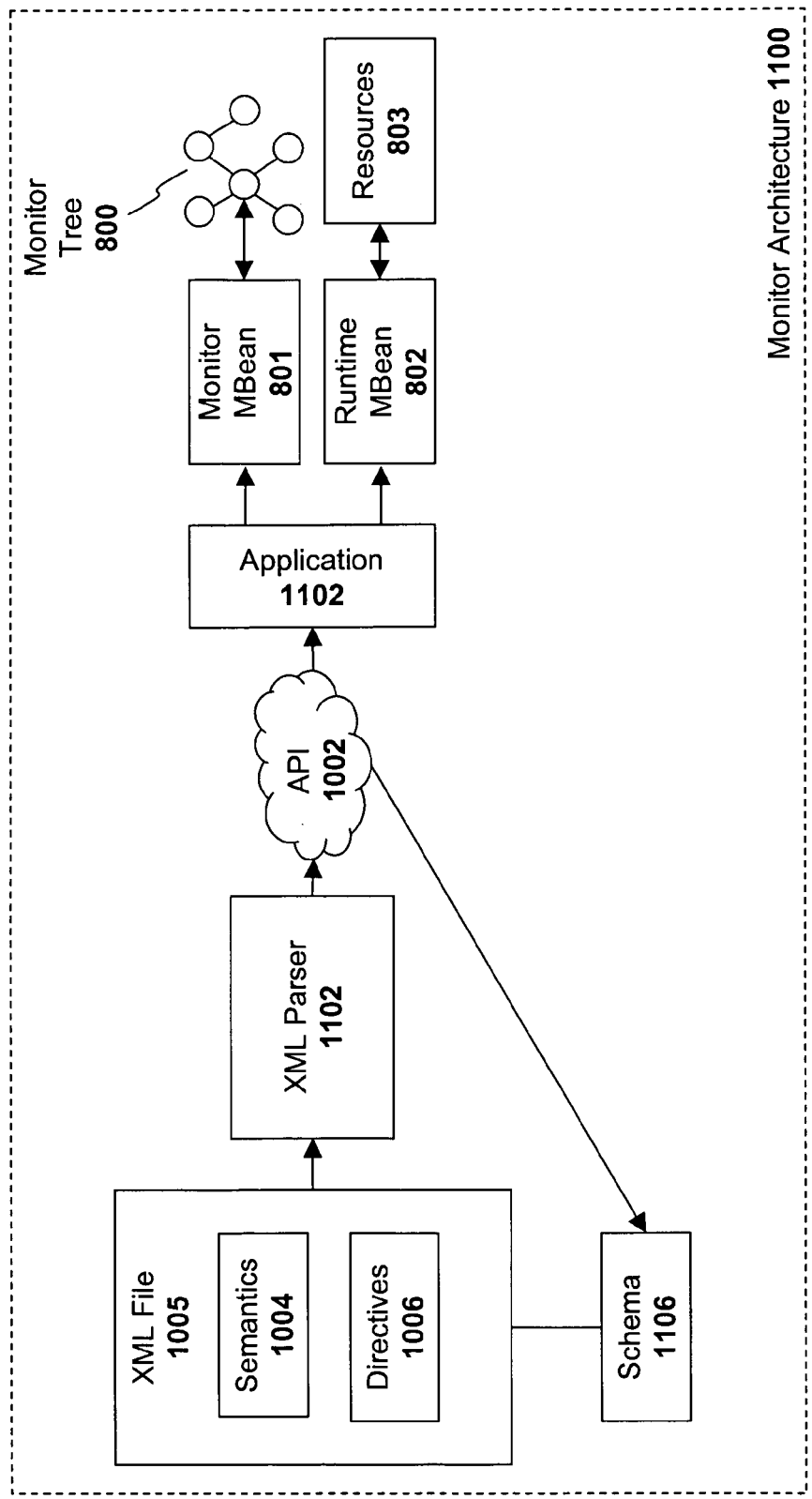

FIG. 11 illustrates additional details associated with the interpretation of the XML file 1005. The semantics 1004, the directives 1006, and other components of the XML file 1005 may be parsed using an application known as the XML parser (or XML processor) 1102. The XML file 1005 and the schema (or scheme or plan) 1106, if any, associated with the XML file 1005 may be interpreted by the XML parser 1102 for parsing of the semantics 1004 and directives 1006 contained in the XML file 1005, and for organizing, formatting, and validating of the information.

The XML parser 1102 may provide an application 1104 (or other type of software module) with access to the elements of the XML file 1005 to establish a link between the XML file 1005 and other components or modules, such as the application programming interface ("API") 1002, of the monitoring architecture 1100. For example, the API 1002 and the XML parser 1102 may be used to generate the monitor tree 800 (e.g., by assigning the various monitor MBeans 801 to their associated resources at various nodes within the monitor tree 800). According to one embodiment, for the purposes of customizing the monitor tree 800, the API 1002 may include a bootstrapper which includes a code or a sequence of codes to initiate relationships between component agents and the MBeans 801. Customizing of the monitor tree 800 may include establishing values (e.g., thresholds, descriptions, ... etc) that may be registered along with each monitor MBean 801.

The XML file 1005 may be parsed in several ways including using the Document Object Model ("DOM"), which reads the entire XML file 1005 and forms a tree structure, or using the Simple API for XML ("SAX"), which is regarded as an event-driven parser that reads the XML file 1005 in segments. The API 1002 may be a Java Management Extensions (JMX)-based API. Examples of Java or JMX-based APIs include J2EE XML API, Java API for XML Processing ("JAXP"), Java Messaging Service ("JMS") API, Java API for XML Messaging ("JAXM"), Java Transaction API ("JTA"), Java API for XML-Remote Procedure Call ("JAX-RPC"), Java API XML Binding ("JAXB"), and Java API for XML Registries ("JAXR").

As described above with respect to FIG. 9a, runtime MBeans 802 may be configured to actively transmit monitoring information related to the resource 803 with which they are associated. In addition, one embodiment illustrated in FIG. 12, employs a notification service 1201 to provide a comprehensive view of all of the notifications generated by the runtime MBeans across the entire cluster. For example, certain MBeans may be configured to generate active "notifications" to the notification service 1201 on certain specified events such as start/stop, get/set properties, etc, of their associated resources. The notification service 1201 then provides a cluster-wide indication of these specified events to any visual administrator (or other type of client) coupled to any node within the cluster. Two different users connected via two different machines may use the notification service to view a comprehensive, up-to-date state of the system.

Figure 12:
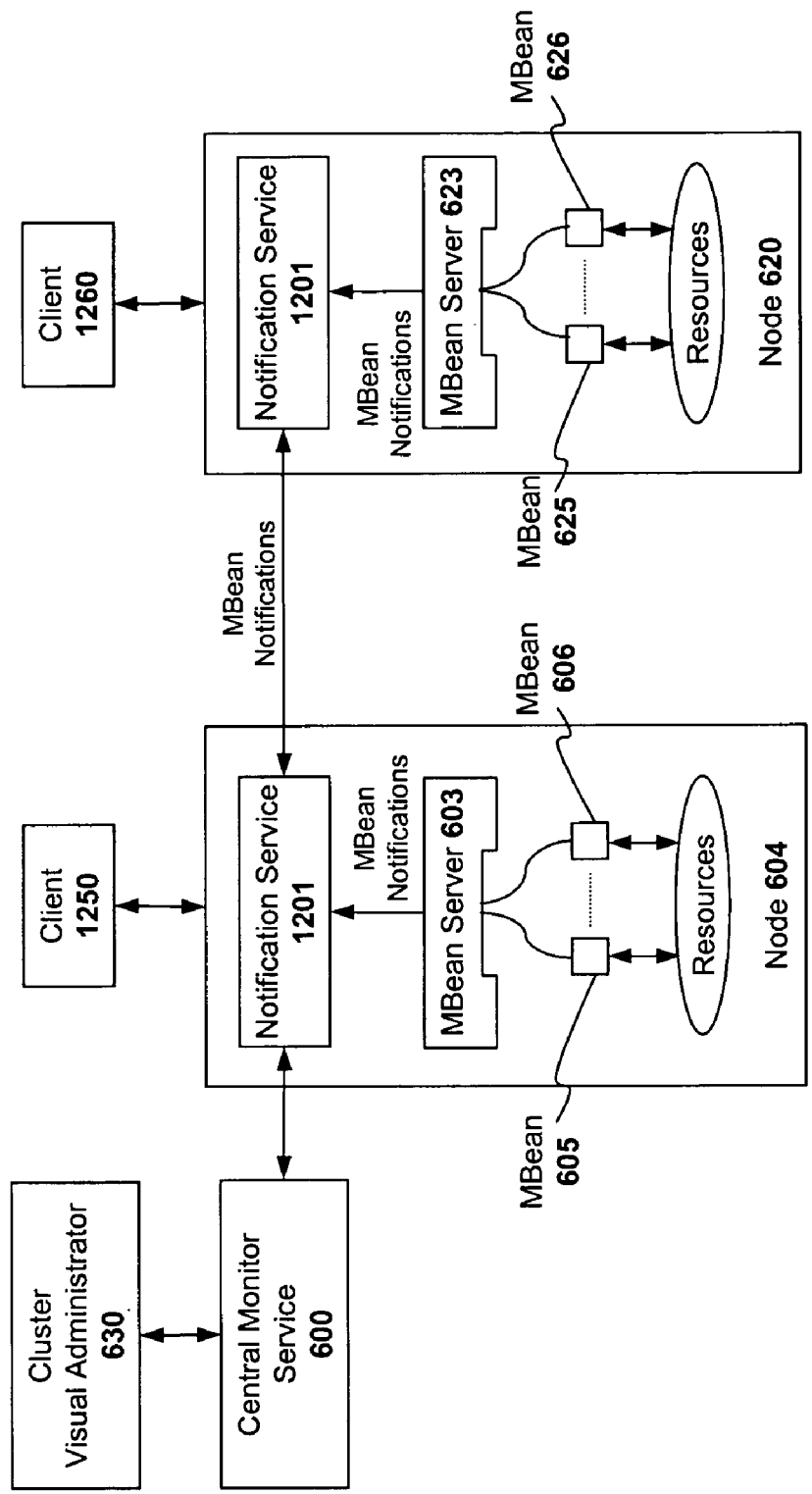
FIG. 12 illustrates a notification service employed in one embodiment of the invention to provide active cluster-wide notification updates.

Thus, referring to the specific example illustrated in FIG. 12, MBean 625 may be configured to generate active notifications in response to certain specified events. In response to detecting one of the events, the MBean 625 generates a notification which is received by the notification service 1201 (i.e., via MBean server 623). The notification service 1201 then communicates the MBean notification to all other nodes within the cluster and provides the notification to any objects that are registered with the notification service 1201 as listeners. Accordingly, the notification will be viewable from client 1250 coupled directly to node 604, as well as client 1260, coupled directly to the node on which the notification was generated. In other words, a single, unified view of cluster-wide notifications is available from any of the nodes in the cluster. In one embodiment, the notification service 1201 utilizes the message passing architecture provided via the central services instance 300 shown in FIG. 3 to enable cluster-wide communication of MBean notifications (e.g., by exchanging notifications via the messaging service 304).

Notifications may take on various forms while still complying with the underlying principles of the invention. In one embodiment, each notification will have a time stamp, sequence number, and a human-readable message indicating the type of notification, and the reason for the notification (e.g., a particular threshold value was reached, a resource went offline, ... etc).

In one embodiment, a notification application programming interface is defined to enable use of notifications. For example, a "Notification Broadcaster" class may be employed for notification generators (e.g., MBean 625 in the previous example). In addition, a "Notification Listener" class may be employed for any objects interested in receiving notifications. In one embodiment, a "Notification Filter" class may also be defined for filtering out certain types of notifications (e.g., on behalf of certain specified Notification Listeners).

Figure 13:
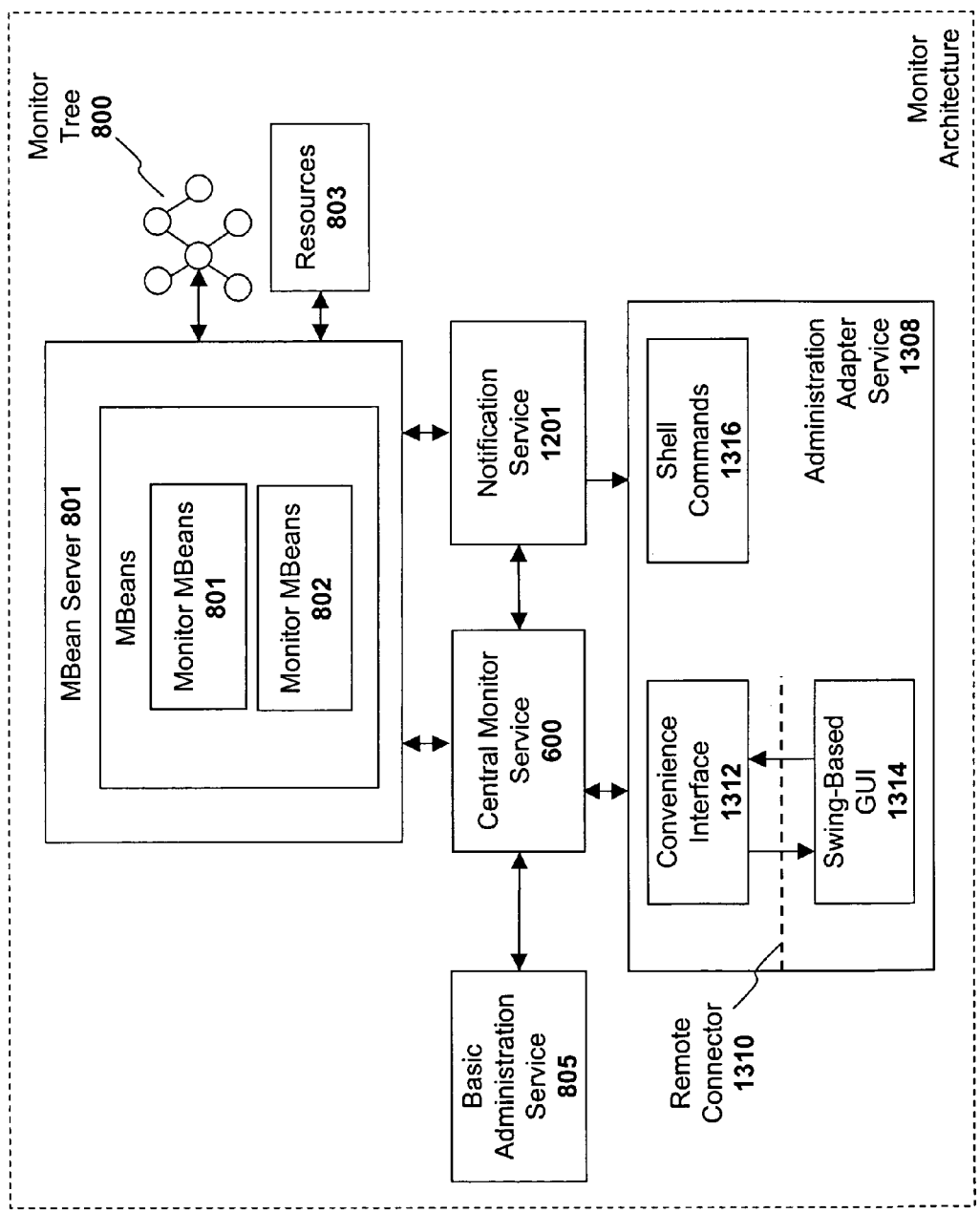
FIG. 13 illustrates an embodiment of the invention which includes a plurality of different management/monitoring services.

FIG. 13 illustrates a group of services for performing resource monitoring functions according to one embodiment of the invention. In addition to the monitor service 600 and notification service 1201, the illustrated monitoring architecture includes a basic administration service (<basicadmin> or administration service) 805 and an administration adapter service (<adminadapter> or adapter service) 1308.

As described above with respect to FIG. 8a-b, the administration service 805 provides instrumentation of certain modules and components (e.g., libraries and interfaces) and also facilitates registration of MBeans with the MBean server 810 via the monitor service 600. Recall that monitor MBeans 801 registered with the MBean server 810 represent individual tree nodes (nodes) of the monitor tree 800. Each of the monitor MBeans 801 may be used, for example, for reboot and shutdown, as well as for defining the type of nodes (e.g., dispatcher or server type nodes) and the resources associated with each of the nodes, for which monitoring information may be retrieved from runtime MBeans 802. The runtime MBeans 802 may be used for monitoring of all clusters and associated resources 803.

In one embodiment, the administration service 805 provides for registration of two logical types of MBeans: standard MBeans and specific beans. Standard MBeans may provide standard functionality of start/stop and get/set properties of their associated resources. Standard MBeans may be registered by default for all deployed components or resources (e.g., kernel, libraries, interfaces, services, etc). By contrast, specific beans may provide component-specific functionalities that may vary from one component to another. To have specific beans, a component may register an object that may implement a specific interface to list the processes available for its management and to extend the management interface (e.g., "com.company.engine.frame.state. ManagementInterface").

For kernel resources, a standard bean may be registered with each manager having a specific bean. A prerequisite for this may be to return a non-null value in a method (e.g., getManagementInterface( )) from the manager interface. For libraries and interfaces, only standard beans may be registered. For services, except for the already registered standard beans, each of the services may register specific beans, and implementation of the management interface may also cause a specific bean to be registered for that particular service.

The adapter service 1308 employed in one embodiment of the invention is part of the manager level 201 of the monitoring architecture (see, e.g., FIG. 2). In one embodiment, the adapter service 1308 includes (1) a remote connector 1310; (2) a "convenience" interface 1312; (3) a "swing-based" Graphical User Interface ("GUI") 1314; and (4) a shell command interface 1316. The adapter service 1308 provides remote access to the MBean server 810 via The remote connector 1310. For example, users may connect from a remote client and view monitoring information relating to monitored resources 803 via the remote connector 1310. Moreover, when used in conjunction with the notification service 1201, users will be provided with a comprehensive view of monitoring data from the entire cluster, as described above with respect to FIG. 13.

The convenience interface 1312 may allow users to remotely access the MBean server 810 using remote administration tools. Remotely accessing the MBean server 810 may include remotely accessing and working with the MBeans as registered by the administration service 805 based on the semantics of the resources 803 that are instrumented and monitored by the MBeans. Stated differently, the adapter service 1308 provides a high-level view of the MBean server 810 and all other MBean servers within the cluster (e.g., as represented by the monitor tree 800). This higher level view may be represented by a monitor tree, the root of which is an MBean that instruments the cluster. The adapter service 1308 may interpret the monitor tree 800 and provide interfaces for managing each type of node within the monitor tree 800. Various different node types may be defined. By way of example, the node types within the monitor tree may include a root node representing the cluster ("TYPE_CLUSTER_MBEAN"), a basic cluster node type representing a node within the cluster ("TYPE_CLUSTER_NODE_MBEAN"), a standard MBean that instruments the kernel of a cluster node ("TYPE_KERNEL_MBEAN"), a standard MBean that instruments a service ("TYPE_SERVICE_MBEAN"), a standard MBean that instruments a library ("TYPE_LIBRARY_MBEAN"), a standard MBean that instruments an interface ("TYPE_INTERFACE_MBEAN"), a standard MBean that instruments a defined group of clusters ("TYPE_GROUP"), and all other MBeans ("TYPE_UNSPECIFIED_MBEAN"). It should be noted, however, that the underlying principles of the invention are not limited to any particular set of MBean types.

The swing-based GUI 1314 employed in one embodiment of the invention may use the convenience interface 1312 and the monitor tree 800 to represent the management functionality of the monitoring architecture to a network administrator or end user. The console counterpart of the GUI administrator may consist of various shell commands 1316 that may be grouped together in an administration command group.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above focus on a JMX implementation within a J2EE environment, certain underlying principles of the invention are not limited to any particular specification. For example, the invention may be implemented within the context of other object-oriented and non-object-oriented programming environments, and may also be employed within future releases of the Java standard, or other standards (e.g., Microsoft's. NET standard).

Accordingly, the scope and spirit of the invention should be judged in terms of the claims which follow.

What is claimed is:

1. A multi-service monitoring system comprising:
computer server systems having a cluster of application servers communicatively coupled on a computer network to serve software application over the computer network to a plurality of computer client systems, wherein each computer server system including an application server having:
an administration service to generate runtime management beans ("MBeans"), wherein each runtime MBean is associated with one or more resources such that each runtime MBean serves as an intermediary between its one or more associated resources and a corresponding monitor MBean of monitor MBeans that seeks monitoring data relating to the one or more resources, each runtime MBean collecting monitoring data relating to the one or more associated resources and reporting the monitoring data to the corresponding monitor MBean, wherein each monitor MBean to actively receive the monitoring data from a corresponding runtime MBean via active instrumentation, wherein the active instrumentation is performed upon occurrence of a specified event associated with the one or more resources; and
a monitor service in communication with the administration service, the monitor service to generate the monitor MBeans, each monitor MBean being directly mapped to a corresponding runtime MBean and indirectly mapped to a resource associated with the corresponding runtime MBean, and each monitor MBean having a resource identifier to identify its corresponding runtime MBean;

wherein each computer server system including an application server further having:
a notification server to generate notifications in response to occurrence of one or more specified events relating to one or more runtime MBeans or one or more monitor MBeans, the notification service providing the notifications to each application server in the cluster of application servers.

2. The system as in claim 1 wherein each computer server system including an application server further having:
a graphical user interface to hierarchically display the monitoring data associated with resources associated with server nodes based on a hierarchical arrangement of the server nodes in a hierarchical tree structure.

3. The system as in claim 1 wherein the runtime MBeans include standard runtime MBeans and specific runtime MBeans, the standard runtime MBeans providing one or more predefined standard functions for their associated resources, and the specific MBeans providing one or more resource-specific functions for their associated resources, wherein the standard functions include starting and stopping of a resource, and wherein the specified events include a resource reaching a first threshold value indicating the resource is available, and reaching a second threshold value representing a critical resource value indicating the resource is not available.

4. The system as in claim 1, wherein the one or more resources comprise one or more system resources including one or more of kernel resources, application components, and libraries.

5. The system as in claim 1, wherein the monitor MBeans is further to passively receive the monitoring data from the runtime MBeans via passive instrumentation, the passive instrumentation including runtime MBeans automatically providing the monitoring data to the monitor MBeans.

6. The system as in claim 1, wherein the notification service includes one or more of a notification broadcaster to facilitate generation of the notifications, a notification listener to facilitate reception of the notifications, and a notification filter to filter the notifications on behalf of the notification listener.

7. The system as in claim 1, wherein the monitoring data comprises monitor updates including one or more of a string monitor to monitor text as string values, an integer monitor to monitor an integer value, a table monitor to monitor a table containing a header and a contents, a state monitor to assign colors to the string values, an availability monitor to monitor a Boolean value indicating whether a resource is available, a frequency monitor to compute a frequency according to reported number of events given at specified times, a quality rate monitor to compute an average quality rate or an actual quality rate according to a reported number of total tries and successful tries, a pool monitor to monitor a pool characterized by configurable values or runtime values, and a cache monitor to monitor a cache characterized by a configurable maximum cache size or a number of current used objects.

8. A method comprising:
communicatively coupling a cluster of application servers on a network to serve software applications over the network to a plurality of clients;
generating runtime management beans ("MBeans"), wherein each runtime MBean is associated with one or more resources such that each runtime MBean serves as an intermediary between its one or more associated resources and a corresponding monitor MBean of monitor MBeans that seeks monitoring data relating to the one or more resources, each runtime MBean collecting monitoring data relating to the one or more associated resources and reporting the monitoring data to the corresponding monitor MBean, wherein each monitor MBean to actively receive the monitoring data from a corresponding runtime MBean via active instrumentation, wherein the active instrumentation is performed upon occurrence of a specified event associated with the one or more resources;
generating the monitor MBeans, each monitor MBean being directly mapped to a corresponding runtime MBean and indirectly mapped to a resource associated with the corresponding runtime MBean, and each monitor MBean having a resource identifier to identify its corresponding runtime MBean; and
generating notifications in response to occurrence of one or more specified events relating to one or more runtime MBeans or one or more monitor MBeans, the notification service providing the notifications to each application server of the cluster of application servers.

9. The method as in claim 8 further comprising:
hierarchically displaying, via a graphical user interface, the monitoring data associated with resources associated with server nodes based on a hierarchical arrangement of the server nodes in a hierarchical tree structure.

10. The method as in claim 8 wherein the runtime MBeans include standard runtime MBeans and specific runtime MBeans, the standard runtime MBeans providing one or more predefined standard functions for their associated resources, and the specific MBeans providing one or more resource-specific functions for their associated resources.

11. The method as in claim 8, further comprising passively reporting the monitoring data from the runtime MBeans, at an instrumentation level, to the monitor MBeans, at an agent level, according to a predetermined schedule.

12. The method as in claim 11, further comprising actively reporting the monitoring data from the runtime MBeans to the monitor MBeans at an occurrence of an event or in response to a request from a monitor MBean.

13. The method as in claim 8, wherein the monitor MBeans is further to passively receive the monitoring data from the runtime MBeans via passive instrumentation, the passive instrumentation including runtime MBeans automatically providing the monitoring data to the monitor MBeans.

14. The method as in claim 8, wherein the notification service includes one or more of a notification broadcaster to facilitate generation of the notifications, a notification listener to facilitate reception of the notifications, and a notification filter to filter the notifications on behalf of the notification listener.

15. The method as in claim 8, wherein the monitoring data comprises monitor updates including one or more of a string monitor to monitor text as string values, an integer monitor to monitor an integer value, a table monitor to monitor a table containing a header and a contents, a state monitor to assign colors to the string values, an availability monitor to monitor a Boolean value indicating whether a resource is available, a frequency monitor to compute a frequency according to reported number of events given at specified times, a quality rate monitor to compute an average quality rate or an actual quality rate according to a reported number of total tries and successful tries, a pool monitor to monitor a pool characterized by configurable values or runtime values, and a cache monitor to monitor a cache characterized by a configurable maximum cache size or a number of current used objects.

16. A non-transitory machine-readable storage medium comprising instructions which, when executed, cause a machine to:

communicatively couple a cluster of application servers on a network to serve software applications over the network to a plurality of clients, each of the application servers comprising server nodes;

generate runtime management beans ("MBeans"), wherein each runtime MBean is associated with one or more resources such that each runtime MBean serves as an intermediary between its one or more associated resources and a corresponding monitor MBean of monitor MBeans that seeks monitoring data relating to the one or more resources, each runtime MBean collecting monitoring data relating to the one or more associated resources and reporting the monitoring data to the corresponding monitor MBean, wherein each monitor MBean to actively receive the monitoring data from a corresponding runtime MBean via active instrumentation, wherein the active instrumentation is performed upon occurrence of a specified event associated with the one or more resources; and generate the monitor MBeans, each monitor MBean being directly mapped to a corresponding runtime MBean and indirectly mapped to a resource associated with the corresponding runtime MBean, and each monitor MBean having a resource identifier to identify its corresponding runtime MBean, wherein the instructions which, when executed, further cause the machine to:

generate notifications in response to occurrence of one or more specified events relating to one or more runtime MBeans or one or more monitor MBeans, the notification service providing the notifications to each application server of the cluster of application servers.

17. The non-transitory machine-readable storage medium as in claim 16 wherein the instructions which, when executed, further cause the machine to:

hierarchically display, via a graphical user interface, the monitoring data associated with resources associated with server nodes based on a hierarchical arrangement of the server nodes in a hierarchical tree structure.

18. The non-transitory machine-readable storage medium as in claim 16 wherein the runtime MBeans include standard runtime MBeans and specific runtime MBeans, the standard runtime MBeans providing one or more predefined standard functions for their associated resources, and the specific MBeans providing one or more resource-specific functions for their associated resources.

19. The non-transitory machine-readable storage medium as in claim 16, wherein the monitor MBeans is further to passively receive the monitoring data from the runtime MBeans via passive instrumentation, the passive instrumentation including runtime MBeans automatically providing the monitoring data to the monitor MBeans.

20. The non-transitory machine-readable storage medium as in claim 16, wherein the notification service includes one or more of a notification broadcaster to facilitate generation of the notifications, a notification listener to facilitate reception of the notifications, and a notification filter to filter the notifications on behalf of the notification listener.

21. The non-transitory machine-readable storage medium as in claim 16, wherein the monitoring data comprises monitor updates including one or more of a string monitor to monitor text as string values, an integer monitor to monitor an integer value, a table monitor to monitor a table containing a header and a contents, a state monitor to assign colors to the string values, an availability monitor to monitor a Boolean value indicating whether a resource is available, a frequency monitor to compute a frequency according to reported number of events given at specified times, a quality rate monitor to compute an average quality rate or an actual quality rate according to a reported number of total tries and successful tries, a pool monitor to monitor a pool characterized by configurable values or runtime values, and a cache monitor to monitor a cache characterized by a configurable maximum cache size or a number of current used objects.

* * * * *